United States Patent
Lee et al.

(10) Patent No.: US 11,704,406 B2
(45) Date of Patent: *Jul. 18, 2023

(54) DERIVING AND SURFACING INSIGHTS REGARDING SECURITY THREATS

(71) Applicant: Abnormal Security Corporation, San Francisco, CA (US)

(72) Inventors: Yu Zhou Lee, San Francisco, CA (US); Kai Jiang, San Francisco, CA (US); Su Li Debbie Tan, San Francisco, CA (US); Geng Sng, San Francisco, CA (US); Cheng-Lin Yeh, San Francisco, CA (US); Lawrence Stockton Moore, San Francisco, CA (US); Sanny Xiao Lang Liao, San Francisco, CA (US); Joey Esteban Cerquera, San Francisco, CA (US); Jeshua Alexis Bratman, New York, NY (US); Sanjay Jeyakumar, Berkeley, CA (US); Nishant Bhalchandra Karandikar, San Francisco, CA (US)

(73) Assignee: Abnormal Security Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,931

(22) Filed: Sep. 12, 2022

(65) Prior Publication Data
US 2023/0020623 A1     Jan. 19, 2023

Related U.S. Application Data

(63) Continuation of application No. 17/547,141, filed on Dec. 9, 2021.

(Continued)

(51) Int. Cl.
*G06F 21/55* (2013.01)

(52) U.S. Cl.
CPC ...... *G06F 21/552* (2013.01); *G06F 2221/034* (2013.01)

(58) Field of Classification Search
CPC ................. G06F 21/552; G06F 2221/034
See application file for complete search history.

(56) References Cited

U.S. PATENT DOCUMENTS

| 5,999,932 A | 12/1999 | Sunil |
| 6,023,723 A | 2/2000 | McCormick |

(Continued)

FOREIGN PATENT DOCUMENTS

| CH | 104580100 A | * | 4/2015 | ............. H04L 29/06 |
| CH | 115221862 A | * | 10/2022 | ........... G06F 40/216 |
| CN | 107315954 | | 11/2017 | |

OTHER PUBLICATIONS

Machine translation of Lou et al, CH 115221862 A, Jun. 10, 2022, 1 page.*

(Continued)

*Primary Examiner* — Christopher A Revak
(74) *Attorney, Agent, or Firm* — Van Pelt, Yi & James LLP

(57) ABSTRACT

Deriving and surfacing insights regarding security threats is disclosed. A plurality of features associated with a message is determined. A plurality of facet models is used to analyze the determined features. Based at least in part on the analysis, it is determined that the message poses a security threat. A prioritized set of information is determined to be provided as output that is representative of why the message was determined to pose a security threat. At least a portion of the prioritized set of information is provided as output.

21 Claims, 11 Drawing Sheets

Related U.S. Application Data

(60) Provisional application No. 63/123,865, filed on Dec. 10, 2020.

(56) References Cited

U.S. PATENT DOCUMENTS

| | | | |
|---|---|---|---|
| 6,088,717 | A | 7/2000 | Reed |
| 7,263,506 | B2 | 8/2007 | Lee |
| 7,451,487 | B2 | 11/2008 | Oliver |
| 7,610,344 | B2 | 10/2009 | Mehr |
| 7,953,814 | B1 | 5/2011 | Chasin |
| 8,112,484 | B1 | 2/2012 | Sharma |
| 8,244,532 | B1 | 8/2012 | Begeja |
| 8,566,938 | B1 | 10/2013 | Prakash |
| 8,819,819 | B1 | 8/2014 | Johnston |
| 8,935,788 | B1 | 1/2015 | Diao |
| 9,009,824 | B1 | 4/2015 | Chen |
| 9,154,514 | B1 | 10/2015 | Prakash |
| 9,213,827 | B2 | 12/2015 | Li |
| 9,245,115 | B1 | 1/2016 | Jakobsson |
| 9,245,225 | B2 | 1/2016 | Winn |
| 9,264,418 | B1 | 2/2016 | Crosley |
| 9,348,981 | B1 | 5/2016 | Hearn |
| 9,473,437 | B1 | 10/2016 | Jakobsson |
| 9,516,053 | B1 | 12/2016 | Muddu |
| 9,537,880 | B1 | 1/2017 | Jones |
| 9,571,512 | B2 | 2/2017 | Ray |
| 9,686,308 | B1 | 6/2017 | Srivastava |
| 9,756,007 | B1 | 9/2017 | Stringhini |
| 9,774,626 | B1 | 9/2017 | Himler |
| 9,781,152 | B1 | 10/2017 | Mistratov |
| 9,847,973 | B1 | 12/2017 | Jakobsson |
| 9,940,394 | B1 | 4/2018 | Grant |
| 9,946,789 | B1 | 4/2018 | Li |
| 9,954,805 | B2 | 4/2018 | Nigam |
| 9,961,096 | B1 | 5/2018 | Pierce |
| 9,967,268 | B1 | 5/2018 | Hewitt |
| 10,015,182 | B1 | 7/2018 | Shintre |
| 10,104,029 | B1 | 10/2018 | Chambers |
| 10,129,194 | B1 | 11/2018 | Jakobsson |
| 10,129,288 | B1 | 11/2018 | Xie |
| 10,243,989 | B1 | 3/2019 | Ding |
| 10,250,624 | B2 | 4/2019 | Mixer |
| 10,277,628 | B1 | 4/2019 | Jakobsson |
| 10,362,057 | B1 | 7/2019 | Wu |
| 10,397,272 | B1 | 8/2019 | Bruss |
| 10,419,468 | B2 | 9/2019 | Glatfelter |
| 10,523,609 | B1 | 12/2019 | Subramanian |
| 10,601,865 | B1 | 3/2020 | Mesdaq |
| 10,616,272 | B2 | 4/2020 | Chambers |
| 10,673,880 | B1 | 6/2020 | Pratt |
| 10,721,195 | B2 | 7/2020 | Jakobsson |
| 10,834,127 | B1 | 11/2020 | Yeh |
| 10,911,489 | B1 | 2/2021 | Chechik |
| 10,972,483 | B2 | 4/2021 | Thomas |
| 10,972,485 | B2 | 4/2021 | Ladnai |
| 11,019,076 | B1 | 5/2021 | Jakobsson |
| 11,451,576 | B2 | 9/2022 | Kao |
| 11,494,421 | B1 | 11/2022 | Ghafourifar |
| 2002/0002520 | A1 | 1/2002 | Gatto |
| 2002/0116463 | A1 | 8/2002 | Hart |
| 2003/0204569 | A1 | 10/2003 | Andrews |
| 2004/0030913 | A1 | 2/2004 | Liang |
| 2004/0117450 | A1 | 6/2004 | Campbell |
| 2004/0128355 | A1 | 7/2004 | Chao |
| 2004/0215977 | A1 | 10/2004 | Goodman |
| 2004/0260922 | A1 | 12/2004 | Goodman |
| 2005/0039019 | A1 | 2/2005 | Delany |
| 2005/0187934 | A1 | 8/2005 | Motsinger |
| 2005/0198518 | A1 | 9/2005 | Kogan |
| 2006/0036698 | A1 | 2/2006 | Hebert |
| 2006/0053203 | A1 | 3/2006 | Mijatovic |
| 2006/0253581 | A1 | 11/2006 | Dixon |
| 2007/0074169 | A1 | 3/2007 | Chess |
| 2007/0276851 | A1 | 11/2007 | Friedlander |
| 2008/0005249 | A1 | 1/2008 | Hart |
| 2008/0086532 | A1 | 4/2008 | Cunningham |
| 2008/0114684 | A1 | 5/2008 | Foster |
| 2008/0201401 | A1 | 8/2008 | Pugh |
| 2009/0037350 | A1 | 2/2009 | Rudat |
| 2009/0132490 | A1 | 5/2009 | Okraglik |
| 2010/0115040 | A1 | 5/2010 | Sargent |
| 2010/0211641 | A1 | 8/2010 | Yih |
| 2010/0318614 | A1 | 12/2010 | Sager |
| 2011/0173142 | A1 | 7/2011 | Dasgupta |
| 2011/0179126 | A1 | 7/2011 | Wetherell |
| 2011/0213869 | A1 | 9/2011 | Korsunsky |
| 2011/0214157 | A1 | 9/2011 | Korsunsky |
| 2011/0231510 | A1 | 9/2011 | Korsunsky |
| 2011/0231564 | A1 | 9/2011 | Korsunsky |
| 2011/0238855 | A1 | 9/2011 | Korsunsky |
| 2012/0028606 | A1 | 2/2012 | Bobotek |
| 2012/0110672 | A1 | 5/2012 | Judge |
| 2012/0233662 | A1 | 9/2012 | Scott-Cowley |
| 2012/0278887 | A1 | 11/2012 | Vitaldevara |
| 2012/0290712 | A1 | 11/2012 | Walter |
| 2012/0297484 | A1 | 11/2012 | Srivastava |
| 2013/0041955 | A1 | 2/2013 | Chasin |
| 2013/0086180 | A1 | 4/2013 | Midgen |
| 2013/0191759 | A1 | 7/2013 | Bhogal |
| 2014/0013441 | A1 | 1/2014 | Hencke |
| 2014/0032589 | A1 | 1/2014 | Styler |
| 2014/0181223 | A1 | 6/2014 | Homsany |
| 2014/0365303 | A1 | 12/2014 | Vaithilingam |
| 2014/0379825 | A1 | 12/2014 | Speier |
| 2014/0380478 | A1 | 12/2014 | Canning |
| 2015/0026027 | A1 | 1/2015 | Priess |
| 2015/0128274 | A1 | 5/2015 | Giokas |
| 2015/0143456 | A1 | 5/2015 | Raleigh |
| 2015/0161609 | A1 | 6/2015 | Christner |
| 2015/0228004 | A1 | 8/2015 | Bednarek |
| 2015/0234831 | A1 | 8/2015 | Prasanna Kumar |
| 2015/0237068 | A1 | 8/2015 | Sandke |
| 2015/0295942 | A1 | 10/2015 | Tao |
| 2015/0319157 | A1 | 11/2015 | Sherman |
| 2015/0339477 | A1 | 11/2015 | Abrams |
| 2016/0014151 | A1 | 1/2016 | Prakash |
| 2016/0036829 | A1 | 2/2016 | Sadeh-Koniecpol |
| 2016/0057167 | A1 | 2/2016 | Bach |
| 2016/0063277 | A1 | 3/2016 | Vu |
| 2016/0156654 | A1 | 6/2016 | Chasin |
| 2016/0227367 | A1 | 8/2016 | Alsehly |
| 2016/0253598 | A1 | 9/2016 | Yamada |
| 2016/0262128 | A1 | 9/2016 | Hailpern |
| 2016/0301705 | A1 | 10/2016 | Higbee |
| 2016/0306812 | A1 | 10/2016 | McHenry |
| 2016/0321243 | A1 | 11/2016 | Walia |
| 2016/0328526 | A1 | 11/2016 | Park |
| 2016/0344770 | A1 | 11/2016 | Verma |
| 2016/0380936 | A1 | 12/2016 | Gunasekara |
| 2017/0041296 | A1 | 2/2017 | Ford |
| 2017/0048273 | A1 | 2/2017 | Bach |
| 2017/0098219 | A1 | 4/2017 | Peram |
| 2017/0111506 | A1 | 4/2017 | Strong |
| 2017/0186112 | A1 | 6/2017 | Polapala |
| 2017/0214701 | A1 | 7/2017 | Hasan |
| 2017/0222960 | A1 | 8/2017 | Agarwal |
| 2017/0223046 | A1 | 8/2017 | Singh |
| 2017/0230323 | A1 | 8/2017 | Jakobsson |
| 2017/0230403 | A1 | 8/2017 | Kennedy |
| 2017/0237754 | A1 | 8/2017 | Todorovic |
| 2017/0237776 | A1 | 8/2017 | Higbee |
| 2017/0251006 | A1 | 8/2017 | Larosa |
| 2017/0289191 | A1 | 10/2017 | Thioux |
| 2017/0324767 | A1 | 11/2017 | Srivastava |
| 2017/0346853 | A1 | 11/2017 | Wyatt |
| 2018/0026926 | A1 | 1/2018 | Nigam |
| 2018/0027006 | A1 | 1/2018 | Zimmermann |
| 2018/0084003 | A1 | 3/2018 | Uriel |
| 2018/0084013 | A1 | 3/2018 | Dalton |
| 2018/0091453 | A1 | 3/2018 | Jakobsson |
| 2018/0091476 | A1 | 3/2018 | Jakobsson |
| 2018/0159808 | A1 | 6/2018 | Pal |
| 2018/0189347 | A1 | 7/2018 | Ghafourifar |
| 2018/0196942 | A1 | 7/2018 | Kashyap |

(56) References Cited

U.S. PATENT DOCUMENTS

| | | |
|---|---|---|
| 2018/0219888 A1 | 8/2018 | Apostolopoulos |
| 2018/0227324 A1 | 8/2018 | Chambers |
| 2018/0295146 A1 | 10/2018 | Kovega |
| 2018/0324297 A1 | 11/2018 | Kent |
| 2018/0375814 A1 | 12/2018 | Hart |
| 2019/0014143 A1 | 1/2019 | Syme |
| 2019/0026461 A1 | 1/2019 | Cidon |
| 2019/0028509 A1 | 1/2019 | Cidon |
| 2019/0052655 A1 | 2/2019 | Benishti |
| 2019/0065748 A1 | 2/2019 | Foster |
| 2019/0068616 A1 | 2/2019 | Woods |
| 2019/0081983 A1 | 3/2019 | Teal |
| 2019/0087428 A1 | 3/2019 | Crudele |
| 2019/0089711 A1 | 3/2019 | Faulkner |
| 2019/0104154 A1 | 4/2019 | Kumar |
| 2019/0109863 A1 | 4/2019 | Traore |
| 2019/0141183 A1 | 5/2019 | Chandrasekaran |
| 2019/0166161 A1 | 5/2019 | Anand |
| 2019/0166162 A1 | 5/2019 | Anand |
| 2019/0190929 A1 | 6/2019 | Thomas |
| 2019/0190936 A1 | 6/2019 | Thomas |
| 2019/0199745 A1 | 6/2019 | Jakobsson |
| 2019/0205511 A1 | 7/2019 | Zhan |
| 2019/0222606 A1 | 7/2019 | Schweighauser |
| 2019/0238571 A1 | 8/2019 | Adir |
| 2019/0260780 A1 | 8/2019 | Matthew |
| 2019/0311121 A1 | 10/2019 | Martin |
| 2019/0319905 A1 | 10/2019 | Baggett |
| 2019/0319987 A1 | 10/2019 | Levy |
| 2019/0349400 A1 | 11/2019 | Bruss |
| 2019/0384911 A1 | 12/2019 | Caspi |
| 2020/0007502 A1 | 1/2020 | Everton |
| 2020/0021609 A1 | 1/2020 | Kuppanna |
| 2020/0044851 A1 | 2/2020 | Everson |
| 2020/0053111 A1 | 2/2020 | Jakobsson |
| 2020/0053120 A1 | 2/2020 | Wilcox |
| 2020/0074078 A1 | 3/2020 | Saxe |
| 2020/0076825 A1 | 3/2020 | Vallur |
| 2020/0125725 A1 | 4/2020 | Petersen |
| 2020/0127962 A1 | 4/2020 | Chuhadar |
| 2020/0162483 A1 | 5/2020 | Farhady |
| 2020/0204572 A1 | 6/2020 | Jeyakumar |
| 2020/0287936 A1 | 9/2020 | Nguyen |
| 2020/0344251 A1 | 10/2020 | Jeyakumar |
| 2020/0358804 A1 | 11/2020 | Crabtree |
| 2020/0374251 A1 | 11/2020 | Warshaw |
| 2020/0389486 A1 | 12/2020 | Jeyakumar |
| 2020/0396190 A1 | 12/2020 | Pickman |
| 2020/0396258 A1 | 12/2020 | Jeyakumar |
| 2020/0412767 A1 | 12/2020 | Crabtree |
| 2021/0021612 A1 | 1/2021 | Higbee |
| 2021/0058395 A1 | 2/2021 | Jakobsson |
| 2021/0091962 A1 | 3/2021 | Finke |
| 2021/0092154 A1 | 3/2021 | Kumar |
| 2021/0168161 A1 | 6/2021 | Dunn |
| 2021/0240836 A1 | 8/2021 | Hazony |
| 2021/0272066 A1 | 9/2021 | Bratman |
| 2021/0295179 A1 | 9/2021 | Eyal Altman |
| 2021/0329035 A1 | 10/2021 | Jeyakumar |
| 2021/0336983 A1 | 10/2021 | Lee |
| 2021/0352093 A1 | 11/2021 | Hassanzadeh |
| 2021/0360027 A1 | 11/2021 | Boyer |
| 2021/0365866 A1 | 11/2021 | Kras |
| 2021/0374679 A1 | 12/2021 | Bratman |
| 2021/0374680 A1 | 12/2021 | Bratman |
| 2021/0377286 A1* | 12/2021 | Shukla ............... G06N 5/04 |
| 2022/0021700 A1 | 1/2022 | Devlin |
| 2022/0141252 A1 | 5/2022 | Shi |

OTHER PUBLICATIONS

Machine translation of Zhao et al, CH 104580100 A, Apr. 29, 2015, 1 page.*

Barngrover, Adam, 'Vendor Access Management with IGA', Saviynt Inc. Apr. 24, 2019 (Apr. 24, 2019) Retrieved on Apr. 17, 2021 (Apr. 17, 2021) from <https://saviynt.com/vendor-access-management-with-iga/> entire document, 2 pp.

International Search Report and Written Opinion dated Apr. 24, 2020 of PCT/US2019/067279 (14 pages).

Mahajan, et al., 'Finding HTML Presentation Failures Using Image Comparison Techniques', ASE'14, pp. 91-98 (Year: 2014).

Mont, Marco Casassa, 'Towards accountable management of identity and privacy: Sticky policies and enforceable tracing services', 14th International Workshop on Database and Expert Systems Applications, 2003. Proceedings. IEEE, 2003. Mar. 19, 2003 (Mar. 19, 2003), Retrieved on Apr. 17, 2021 (Apr. 17, 2021) from <https://ieeexplore.ieee.org/abstract/documenV1232051> entire document, Mar. 19, 2003, 17 pp.

Proofpoint (Proofpoint Closed-Loop Email Analysis and Response, Aug. 2018, 2 pages) (Year: 2018).

* cited by examiner

FIGURE 3C

Analysis Overview

Abnormal Security has detected this as a possible Malware & Ransomware attack for the following reasons:

CONTENT: SUSPICIOUS REDIRECT LINK TO WORDPRESS SITE

The email content is usual because the message body contains a suspicious link that redirects to a WP site that may have been hacked. These hijacked sites oftentimes contain payloads for Emotet - a sophisticated trojan that is a direct cause of advanced ransomware attacks.

IDENTITY: UNUSUAL SENDER

The email exhibits suspicious sending behavior: the sender uses language which is attempting to engage, but the email address (@) does not match the display name ("enterprise"), a common pattern in Impersonation attempts.

BEHAVIOR: UNEXPECTED INFORMATION

The email body includes a phone number and offer of assistance, which attackers may use to build trust and evade detection.

43514+ signals analyzed                             What is this?

ATTACK SCORE
97

ATTACK TYPE
Malware & Ransomware

ATTACK ANALYSIS
- Attack Type: Malware
- Attack Strategy: Name Impersonation
- Impersonated Party: Automated System (Internal)
- Attack Vector: Link
- Topic: Invoice Paymnet

Remediation
Auto-Remediated
10:37am 10/27,
Auto-Remediated by Abnormal Security Email in Recoverable Items Folder
[Select Remediation Options]

Campaign Activities
- Received Emails: 3 Recipients
- Forwarded by User: No Recipients
- Replied to message: No Recipients OVERVIEW | [Analysis Overview]

Email Content
ANALYSIS

Content Analysis

Sender Identity Analysis

Email Content
[Default View | Banner View | Analysis]

Subject: Important Info From Canada Receiving Department
Sender: Enterprise via Canada - Receiving Department <canada-receivingdepartment@enterprise.com>
Recipient: Michael Bradshaw <MBradshaw@enterprise.com>
To: Canada - Receiving Department <canada-receivingdepartment@enterprise.com>
Oct 27th 10:37 PDT

DERIVING AND SURFACING INSIGHTS REGARDING SECURITY THREATS

CROSS REFERENCE TO OTHER APPLICATIONS

This application is a continuation of U.S. patent application Ser. No. 17/547,141 entitled DERIVING AND SURFACING INSIGHTS REGARDING SECURITY THREATS filed Dec. 9, 2021, which claims priority to U.S. Provisional Patent Application No. 63/123,865 entitled DERIVING AND SURFACING INSIGHTS REGARDING SECURITY THREATS filed Dec. 10, 2020, each of which is incorporated herein by reference for all purposes.

BACKGROUND OF THE INVENTION

Employees of enterprise organizations receive a variety of types of electronic messages. Some of these messages may be wanted (e.g., legitimate communications made among employees of a given enterprise, or made between employees and entities outside of the enterprise). Others of these messages may be malicious (e.g., attempting to compromise computing infrastructure or defraud the recipient) or otherwise unwanted. Unfortunately, differentiating between various types of messages can be a daunting task, particularly as the number of electronic messages an individual receives on a given day increases. Accordingly, there is an ongoing need for improvements to techniques for managing electronic messages.

BRIEF DESCRIPTION OF THE DRAWINGS

Various embodiments of the invention are disclosed in the following detailed description and the accompanying drawings.

FIG. 3C illustrates an example of an administrator console.

FIG. 4B illustrates an example of a report.

DETAILED DESCRIPTION

Figure 1:
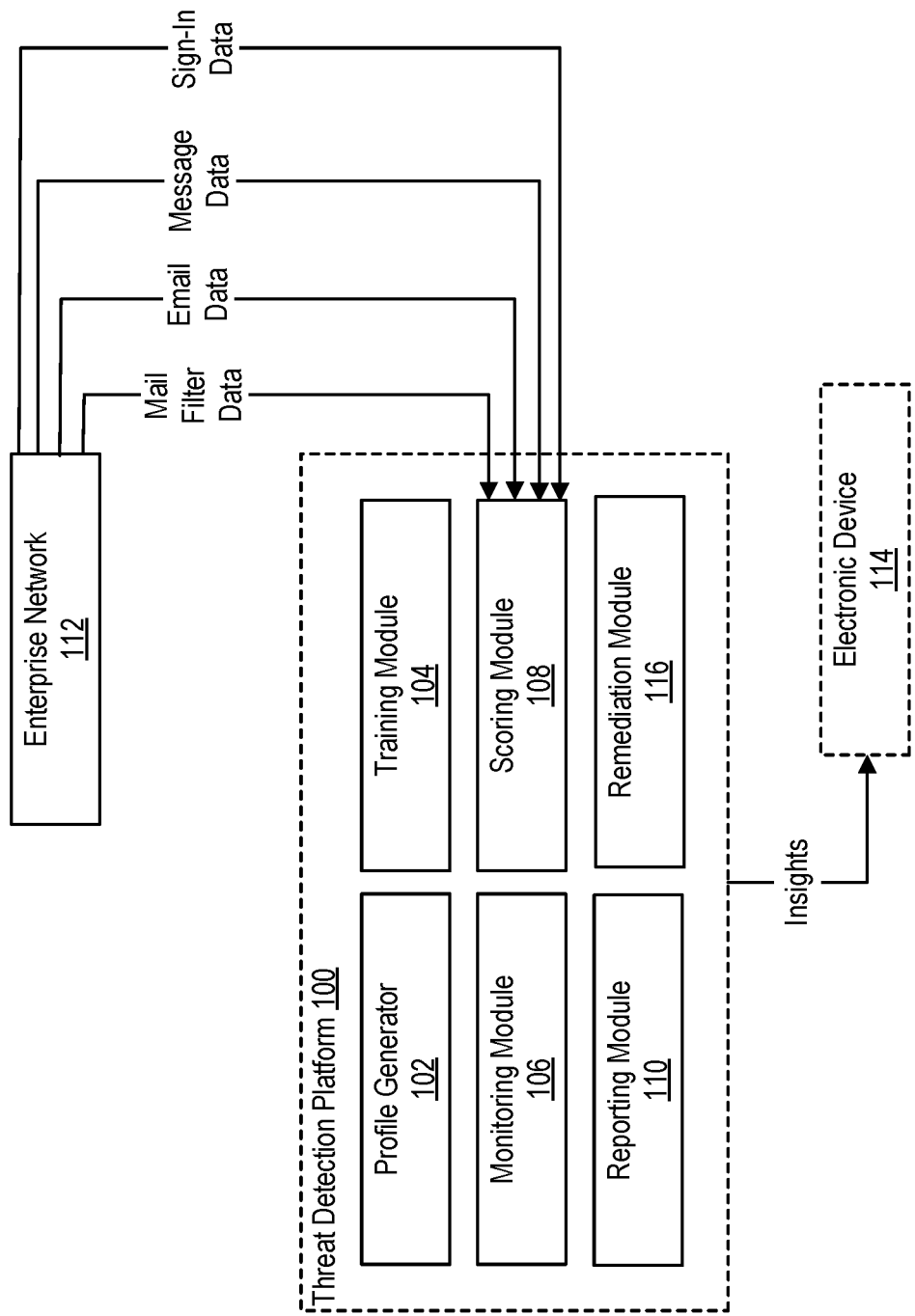
FIG. 1 depicts an example of a threat detection platform that is configured to identify digital activities and communications that may indicate a threat to the security of an enterprise exists.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Introduction

Many enterprises have begun employing and/or utilizing security operations centers to monitor the activities of employees in order to discover and then address security threats (also referred to as "security issues"). The term "security operations center" refers to a centralized unit that deals with security threats on an organization level. Historically, security operations centers have been responsible for monitoring, assessing, and defending the information systems of the corresponding enterprises. Examples of information systems include websites, computer programs, databases, networks, endpoints (e.g., mobile phones and personal computers), and accounts (e.g., for messaging platforms and email platforms).

Malicious actors (also referred to as "attackers" or "adversaries") have continued to become more sophisticated, however. As such, some enterprises have begun deploying computer programs that are designed to autonomously detect security threats in addition to, or instead of, a security operations center. These computer programs may be designed to identify (and, in some instances, remediate) security threats based on an analysis of (i) digital activities performed with accounts associated with employees and/or (ii) digital communications involving accounts associated with employees. While these computer programs have continually improved in discovering security threats, these computer programs struggle to convey the risk posed by those security threats in a readily comprehensible manner.

Computer programs have been developed in an effort to examine digital activities and communications so as to quantify the risk posed to the security of an enterprise (also referred to as a "business" or "organization") in near real time. For instance, a computer program may be designed to examine the content of incoming emails to determine whether any of those emails indicate that account compromise (also referred to as "account takeover") may have occurred. An example of such a computer program is described in U.S. Pat. No. 11,050,793, which is incorporated by reference herein in its entirety. It is beneficial for the insights derived by the computer program to be surfaced in such a manner that the magnitude of the risk can be readily understood.

Described herein are various approaches to surfacing insights derived by computer-implemented models ("models") when applied to the digital conduct of accounts associated with employees of an enterprise (or one or more accounts shared by multiple such employees, etc.). The term "account" may refer to digital profiles with which employees can engage in digital activities. These digital profiles can generally be used to perform activities such as exchanging emails and messages, and thus may also be referred to as "email accounts" or "messaging accounts." The term "digital conduct," meanwhile, may refer to the digital activities that are performed with those accounts. Examples of digital activities include transmitting and receiving digital communications, creating, modifying, and deleting filters to be applied to incoming digital communications, initiating sign-in activities, and the like. Examples of digital communications include emails and messages.

Upon receiving a digital communication, a threat detection platform may apply one or more models in order to establish one or more topics of the digital communication. The term "topic" may refer to a subject that is mentioned in the content of the digital communication. These topic(s) can be derived regardless of whether the digital communication is deemed to be a threat. For example, a communication discussing payment for services may be benign or malicious—in either case, an example "topic" of the communication would be "invoicing." In the event that the threat detection platform determines a given digital communication is representative of a threat, the threat detection platform can generate and then surface a report that specifies an attack goal and the topic(s) of the given digital communication. Together, these pieces of information allow greater insight to be gained by the individual responsible for reviewing the report into the actual threat posed by the given digital communication.

Embodiments are variously described herein with reference to particular types of digital conduct. However, the features of those embodiments can be applied to other types of digital conduct as well. As an example, while embodiments may be described in the context of ascertaining risk based on analysis of an incoming email, a threat detection platform may determine the risk posed by other digital activities, such as the transmission of an outgoing email or the occurrence of a sign-in activity.

While embodiments may be described in the context of computer-executable instructions, aspects of the technology described herein can be implemented via hardware, firmware, or software. As an example, aspects of the threat detection platform may be embodied as instruction sets that are executable by a computer program that offers support for discovering, classifying, and then remediating threats to the security of an enterprise.

References in this description to "an embodiment" or "one embodiment" mean that the feature, function, structure, or characteristic being described is included in at least one embodiment of the technology. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The terms "connected," "coupled," or any variant thereof are intended to include any connection or coupling between two or more elements, either direct or indirect. The connection/coupling can be physical, logical, or a combination thereof. For example, objects may be electrically or communicatively coupled to one another despite not sharing a physical connection.

The term "module" may refer to software components, firmware components, or hardware components. Modules are typically functional components that generate one or more outputs based on one or more inputs. As an example, a computer program may include multiple modules responsible for completing different tasks or a single module responsible for completing all tasks. Unless otherwise specified, an example way of implementing a module referred to herein is as a set of one or more python scripts which may make use of various publicly available libraries, toolkits, etc.

When used in reference to a list of multiple items, the term "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open ended.

II. Threat Detection Platform

FIG. 1 depicts an example of a threat detection platform that is configured to identify digital activities and communications that may indicate a threat to the security of an enterprise exists. As shown in FIG. 1, threat detection platform 100 includes a profile generator 102, a training module 104, a monitoring module 106, a scoring module 108, and a reporting module 110. Some embodiments of threat detection platform 100 include a subset of these components, while other embodiments of the threat detection platform 100 include additional components that are not shown in FIG. 1.

Threat detection platform 100 can acquire data related to digital conduct of accounts associated with employees and then determine, based on an analysis of the data, how to handle security threats in a targeted manner. As shown in FIG. 1, the data can include information related to emails, messages, mail filters, and sign-in activities. As further discussed below, these data are not necessarily obtained from the same source. As an example, data related to emails may be acquired from an email service (e.g., Microsoft Exchange) while data related to messages may be acquired from a messaging service (e.g., Slack). Threat detection platform 100 can identify security threats based on an analysis of incoming emails (e.g., the content of the body, the email address of the sender, etc.), metadata accompanying the incoming emails (e.g., information regarding the sender, recipient, origin, time of transmission, etc.), and other suitable data.

Threat detection platform 100 can be implemented, partially or entirely, within an enterprise network 112, a remote computing environment (e.g., through which the data regarding digital conduct is routed for analysis), a gateway, or another suitable location. The remote computing environment can belong to, or be managed by, the enterprise or another entity. In some embodiments, threat detection platform 100 is integrated into the enterprise's email system (e.g., at a secure email gateway (SEG)) as part of an inline deployment. In other embodiments, threat detection platform 100 is integrated into the enterprise's email system via an application programming interface (API) such as the Microsoft Outlook API. In such embodiments, the threat detection platform 100 can obtain email and other applicable data via the API. Thus, threat detection platform 100 can supplement and/or supplant other security products employed by the enterprise.

In a first variation, threat detection platform 100 is maintained by a threat service (also referred to herein as a "security service") that has access to multiple enterprises' data. In this variation, threat detection platform 100 can route data that is, for example, related to incoming emails to a computing environment managed by the security service. The computing environment can be an instance on Amazon Web Services (AWS). Threat detection platform 100 can maintain one or more databases for each enterprise it services that include, for example, organizational charts (and/or other user/group identifiers/memberships, indicating information such as "Alice is a member of the Engineering group" and "Bob is a member of the Marketing group"), attribute baselines, communication patterns, etc. Additionally or alternatively, threat detection platform 100 can maintain federated databases that are shared among multiple entities. Examples of federated databases include databases specifying vendors and/or individuals who have been deemed fraudulent, domains from which incoming emails determined to represent security threats originated, etc. The security service can maintain different instances of the threat detection platform 100 for different enterprises, or the security service can maintain a single instance of the threat detection platform 100 for multiple enterprises, as applicable. The data hosted in these instances can be obfuscated, encrypted, hashed, depersonalized (e.g., by removing personal identifying information), or otherwise secured or secreted as applicable. Accordingly, in various embodiments, each instance of threat detection platform 100 is only able to access/process data related to the accounts associated with the corresponding enterprise(s).

In a second variation, threat detection platform 100 is maintained by the enterprise whose accounts are being monitored—either remotely or on premises. In this variation, all relevant data may be hosted by the enterprise itself, and any information to be shared across multiple enterprises can be transmitted to a computing system that is maintained by the security service or a third party, as applicable.

As shown in FIG. 1, profile generator 102, training module 104, monitoring module 106, scoring module 108, and reporting module 110 can be integral parts of the threat detection platform 100. Alternatively, these components could be implemented individually, or in various combinations, while operating "alongside" the threat detection platform 100. For example, reporting module 110 can be implemented in a remote computing environment to which the threat detection platform 100 is communicatively connected across a network. As mentioned above, threat detection platform 100 can be implemented by a security service on behalf of an enterprise or the enterprise itself. In some embodiments, aspects of threat detection platform 100 are provided by a web-accessible computer program operating on a computer server or a distributed computing system. For example, an individual can be able to interface with the threat detection platform 100 through a web browser that is executing on an electronic computing device (also referred to as an "electronic device" or "computing device").

Enterprise network 112 can be a mobile network, wired network, wireless network, or some other communication network (or combination of networks) maintained by the enterprise or an operator on behalf of the enterprise. As noted above, the enterprise can use a security service to examine emails (among other things) to discover potential security threats. The enterprise may grant permission to the security service to monitor the enterprise network 112 by examining emails (e.g., incoming emails and/or outgoing emails) and then addressing those emails that represent security threats. For example, threat detection platform 100 may be permitted to remediate threats posed by those emails (e.g., by using an API made available by an email service provider such as a cloud-based email service provider to move or delete such messages), or the threat detection platform 100 may be permitted to surface notification regarding the threats posed by those emails, or combinations thereof. In some embodiments, the enterprise further grants permission to the security service to obtain data regarding other digital activities involving the enterprise (and, more specifically, employees of the enterprise) in order to build a profile that specifies communication patterns, behavioral traits, normal content of emails, etc. For example, threat detection platform 100 may identify the filters that have been created and/or destroyed by each employee to infer whether any significant variations in behavior have occurred. Such filters may comprise rules manually specified by the user (e.g., by the user explicitly interacting with tools made available by an email service) and/or may also be inferred based on users' interactions with their mail (e.g., by obtaining from the email service log data indicating which messages the user has moved from an inbox to a folder, or vice versa).

Threat detection platform 100 can manage one or more databases in which data can be stored. Examples of such data include enterprise data (e.g., email data, message data, sign-in data, and mail filter data), remediation policies, communication patterns, behavioral traits, etc. The data stored in the database(s) can be determined by threat detection platform 100 (e.g., learned from data available on enterprise network 112), provided by the enterprise, or retrieved from an external database (e.g., associated with LinkedIn, Microsoft Office 365, or G Suite) as applicable. Threat detection platform 100 can also store outputs produced by the various modules, including machine- and human-readable information regarding insights into threats and any remediation actions that were taken.

As shown in FIG. 1, threat detection platform 100 includes a profile generator 102 that is responsible for generating one or more profiles for the enterprise. For example, profile generator 102 can generate a separate profile for each account associated with an employee of the enterprise based on sign-in data, message data, email data, and/or mail filter data. Additionally or alternatively, profiles can be generated for business groups, organizational groups, or the enterprise as a whole. By examining data obtained from the enterprise network 112, the profile generator 102 can discover organizational information (e.g., employees, titles, and hierarchy), employee behavioral traits (e.g., based on historical emails, messages, and historical mail filters), normal content of incoming or outgoing emails, behavioral patterns (e.g., when each employee normally logs in), communication patterns (e.g., who each employee communicates with internally and externally, when each employee normally communicates, etc), etc. This information can be populated into the profiles so that each profile can be used as a baseline for what constitutes normal activity by the corresponding account (or group of accounts).

An example includes a number of behavioral traits associated with a given account. For example, profile generator 102 can determine behavioral traits based on sign-in data, message data, email data, and/or mail filter data obtained from the enterprise network 112. The email data may include information on the senders of past emails received by a given email account, content of those past emails, frequency of those past emails, temporal patterns of those past emails, topics of those past emails, geographical locations from which those past emails originated, formatting characteristics (e.g., usage of HTML, fonts, styles, etc.), and more. Thus, profile generator 102 can build a profile for each email account that represents a model of normal behavior of the corresponding employee. As further discussed below, the profiles can be helpful in identifying the digital activities and communications that indicate a security threat may exist.

Monitoring module 106 is responsible for monitoring communications (e.g., messages and emails) handled by the enterprise network 112. These communications can include incoming emails (e.g., external and internal emails) received by accounts associated with employees of the enterprise, outgoing emails (e.g., external and internal emails) transmitted by those accounts, and messages exchanged between those accounts. Monitoring module 106 is able to monitor incoming emails in near real time so that appropriate action can be taken, in a timely fashion, if a malicious email is discovered. For example, if an incoming email is determined to be representative of a phishing attack (e.g., based on an output produced by scoring module 108), the incoming email can be prevented from reaching its intended destination by the monitoring module 106 or another applicable component or set of components. In some embodiments, monitoring module 106 is able to monitor communications only upon threat detection platform 100 being granted permission by the enterprise (and thus given access to enterprise network 112).

Scoring module 108 can be responsible for examining digital activities and communications to determine the likelihood that a security threat exists. For example, scoring module 108 can examine each incoming email to determine how its characteristics compare to past emails received by the intended recipient. In such embodiments, scoring module 108 may determine whether characteristics such as timing, formatting, and location of origination (e.g., in terms of sender email address or geographical location) match a pattern of past emails that have been determined to be non-malicious. For example, scoring module 108 may determine that an email is likely to be malicious if the sender email address ("support-xyz@gmail.com") differs from an email address (John.Doe@CompanyABC.com) that is known to be associated with the alleged sender ("John Doe"). As another example, scoring module 108 may determine that an account may have been compromised if the account performs a sign-in activity that is impossible or improbable given its most recent sign-in activity (e.g., the user logs in from Germany ten minutes after having logged in from California, or a user that typically accesses email from 9 am-5 pm on weekdays begins accessing email on weekends at 3 am).

Scoring module 108 can make use of heuristics, rules, neural networks, or other trained machine learning (ML) approaches such as decision trees (e.g., gradient-boosted decision trees), logistic regression, and linear regression. Accordingly, scoring module 108 can output discrete outputs or continuous outputs, such as a probability metric (e.g., specifying the likelihood that an incoming email is malicious), a binary output (e.g., malicious or not malicious), or a sub-classification (e.g., specifying the type of malicious email). Further, scoring module 108 can rank or otherwise generate a prioritized list of the top features, facets, or combinations thereof, that result in a particular message being identified as posing a security threat.

As further discussed below, scoring module 108 executes a topic inference module in various embodiments. The topic inference module can be used to identify topics of digital communications. Assume, for example, that the scoring module 108 is tasked with quantifying the risk posed by an incoming email. In that situation, the topic inference module may identify one or more topics based on an analysis of the incoming email, its metadata, or information derived by the scoring module. These topics may be helpful in conveying the risk and relevance of the incoming email and for other purposes.

Reporting module 110 is responsible for reporting insights derived from the outputs produced by scoring module 108 in various embodiments (e.g., as a notification summarizing types of threats discovered or other applicable output). For example, reporting module 110 can provide a summary that contains the topics (or information indicative of the topics) produced by scoring module 108 to an electronic device 114. Electronic device 114 may be managed by the employee associated with the account under examination, an individual associated with the enterprise (e.g., a member of the information technology department), or an individual associated with a security service, etc. As further discussed below, reporting module 110 can surface these insights in a human-readable format for display on an interface accessible via the electronic device 114. Such insights can be used to improve the overall security position of the enterprise, by providing specific, concrete reasons why particular communications are problematic to security personnel (or other appropriate individuals, such as end users).

Remediation module 116 can perform one or more remediation actions in response to scoring module 108 determining that an incoming email is likely representative of a threat. The types of remediation that can be taken can be based on the nature of the threat (e.g., its severity, the type of threat posed, the user(s) implicated in the threat, etc.), policies implemented by the enterprise, etc. Such policies can be predefined or dynamically generated based on inference, analysis, and/or the data obtained from enterprise network 112. Additionally or alternatively, remediation action(s) may be based on the outputs produced by the models employed by the various modules, as further discussed below. Examples of remediation actions include transferring suspect emails to another folder such as a quarantine folder, generating an alert (e.g., to an administrator or to the user), etc.

Various embodiments of threat detection platform 100 include a training module 104 that operates to train the models employed by other modules. As an example, training module 104 may train the models applied by scoring module 108 to the sign-in data, message data, email data, and mail filter data, etc., by feeding training data into those models. The training data can include emails that have been labeled as malicious or non-malicious, policies related to attributes of emails (e.g., specifying that emails originating from certain domains should not be considered malicious), etc. The training data may be employee-, group-, or enterprise-specific so that the model(s) are able to perform personalized analysis. In some embodiments, the training data ingested by the model(s) includes emails that are known to be representative of malicious emails sent as part of an attack campaign. These emails may have been labeled as such during a training process, or these emails may have been labeled as such by other employees.

III. Techniques for Deriving Topics for Messages

Threat detection platform 100 can characterize digital communications along several dimensions. These dimensions are also referred to herein as "facets." Facets are useful in several respects. As a first example, the facets can be used by an individual to resolve the types of attacks employed against an enterprise, as well as to create datasets that are useful for training, introspection, etc. The individual may be a member of the information technology department of the enterprise, or the individual may be employed by a security service responsible for monitoring the security of the enterprise. As a second example, facets can be used as a way to divide data internally to allow teams to work on specific subsections of email attacks. These teams can then improve detection of the email attacks by training models on subset data and improve scoring module 108. As a third example, the facets can be provided as input to security operations center (SOC) tools that may be used to filter data, generate reports, etc. An incoming email may be associated with one or more of the following example facets:

Attack Type: This facet indicates whether the incoming email is indicative of business email compromise (BEC), phishing, spoofing, spam, etc. It is derived based on the combination of the following five facets.

Attack Strategy: This facet indicates whether the incoming email qualifies as name impersonation, internal account compromise, external account compromise, a spoofed message, a message originating from an unknown sender, etc.

Impersonated Party: This facet indicates who, if anyone, the incoming email intended to impersonate. Examples include very important persons (VIPs) such as c-suite executives, assistants, employees, contractors, partners, vendors, internal automated systems, external automated systems, or no one in particular.

Attacked Party: This facet indicates who was the target of the attack carried out by the incoming email. Examples include VIPs, assistants, employees, and external recipients such as vendors, contractors, and the like. In some embodiments, this facet may further identify the group or department under attack (e.g., the accounting department, human resources department, etc.).

Attack Goal: This facet indicates the goal of the attack carried out by the incoming email. Examples include invoice fraud, payment fraud, credential theft, ransom, malware, gift card fraud, and the like.

Attack Vector: This facet indicates how the attack is actually carried out, for example, by specifying whether the risk is posed by text, links, or attachments included in the incoming email.

These above example facets can be used as the "building blocks" for describing the nature of communication-based attacks, for example, to enterprises. Together, these facets can be used to characterize an attack along predetermined dimensions. For example, incoming emails can be characterized using one, some, or all of the above facets. A layer of configuration can be used over facets to define, establish, or otherwise determine the nature of an attack. For example, if threat detection platform 100 determines that, for an incoming email, (i) the attack goal is invoice fraud and (ii) the impersonated party is a known partner, then the threat detection platform can define the incoming email as an instance of "external invoice fraud." Consequently, these facets can flow into other functionality provided by threat detection platform 100 such as: (i) internal metrics indicating how the threat detection platform is managing different attack types, (ii) reporting to enterprises, and (iii) filtering for different attack types.

The above facets can be augmented to more completely/accurately represent the nature of a malicious communication. In particular, information regarding the topics mentioned in such communications can be used. Assume, for example, that several incoming emails related to different merger and acquisition scenarios are determined to be representative of phishing attacks. While each of the incoming emails have the same attack goal—that is, scamming the recipients—each incoming email is rather specific in its content. In such a situation, it would be useful to provide information about the actual content of the incoming emails to those individuals responsible for managing the threat posed by those incoming emails. Furthermore, some scenarios call for a more fluid approach to characterizing threats that allows the threat detection platform to more quickly surface new attack types. Historically, it has been difficult to measure, characterize, and report new attack types until sufficient training data regarding those new attack types has been provided to the appropriate models. Note that characterizing threats along a greater number of dimensions also lessens the likelihood of different communications being characterized as similar or identical. As an example, an email inquiring about invoices and an email requesting a quote may both be classified as instances of payment fraud if those emails are characterized along a limited number of dimensions. While those emails may have the same attack goal, the content of those messages is different (and that may be useful information in determining how to discover or remediate future instances of similar emails). An example of two messages sharing the same topic but two different attack goals is a shared topic of "invoice," but the first message having an attack goal of credential phishing ("click here to sign into your account and make a payment or update your payment information") and the second message having an attack goal of payment fraud ("your account is overdue, please send a check to pay your outstanding balance"). An example of two messages sharing the same attack goal but two different topics is a shared attack goal of "credential phishing," but the first message having a topic of "debit account detail updates" ("set up your new direct debit by clicking here") and the second message having a topic of "COVID-19" ("due to COVID-19 we have a new policy, click here to access our client portal and find out more").

Described herein are techniques for characterizing digital communications along a new type of dimension referred to as "topics." Upon receiving a digital communication, threat detection platform 100 can apply one or more models in order to establish one or more topics of the digital communication. The term "topic" refers to a subject that is mentioned (either directly or indirectly) in content of the digital communication. As with the facets mentioned above, a given digital communication can be associated with multiple topics. Various combinations of topics, if present in a given message, can also be assigned/associated with more human meaningful descriptions (e.g., that can then be used to describe the message content instead of/in addition to each of the individual topics).

Topics can be derived by threat detection platform 100 regardless of whether the digital communication is deemed to be representative of an attack or not. In the event that the threat detection platform determines a digital communication is representative of an attack, the threat detection platform can generate and then surface a report that specifies an attack goal and topic(s) of the digital communication. Together, these pieces of information allow greater insight to be gained by the individual responsible for reviewing the report into the actual threat posed by the digital communication.

Figure 2A:
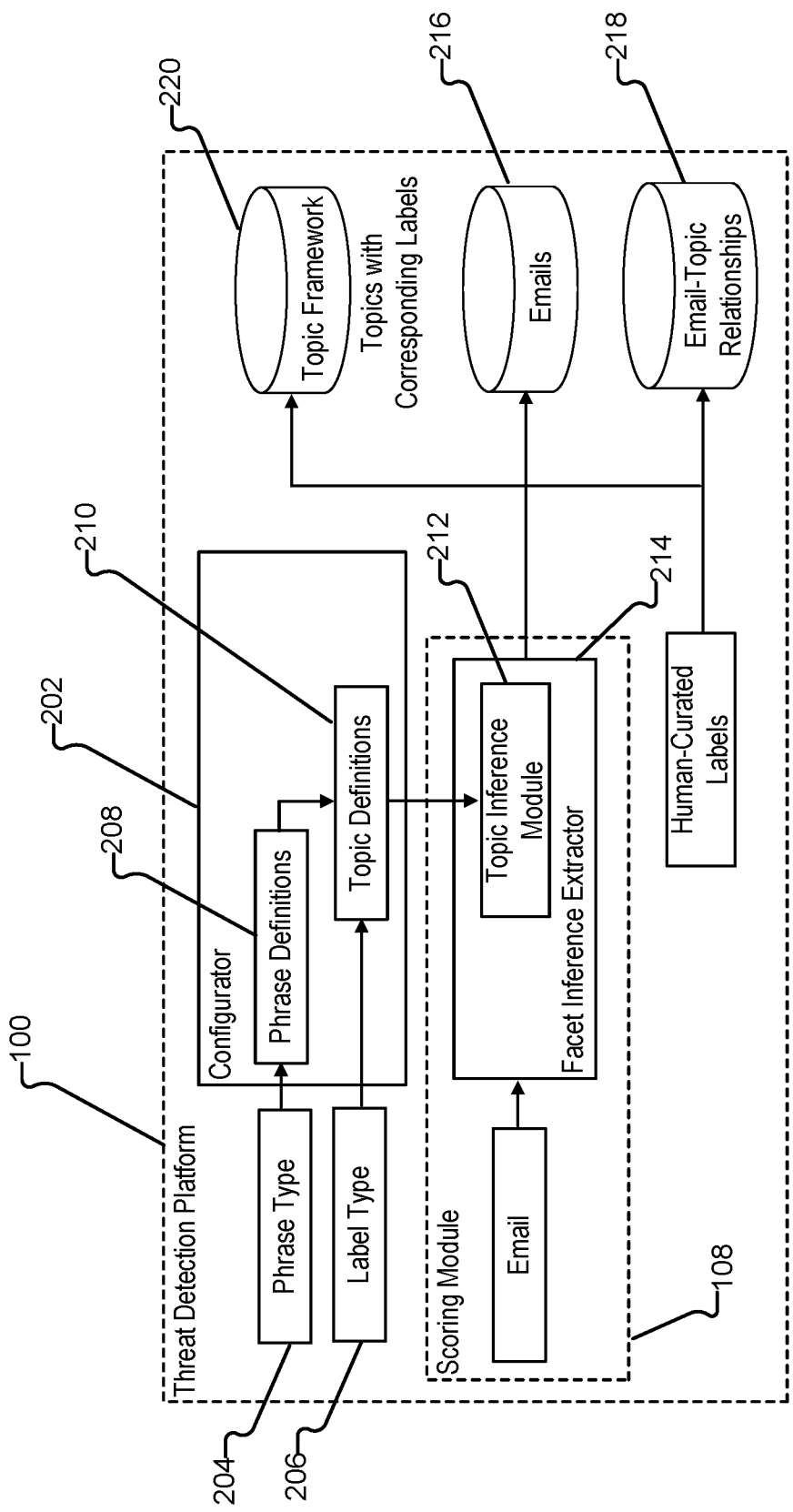
FIG. 2A illustrates an example of how topics of a digital communication can be discovered.

FIG. 2A illustrates an example of how topics of a digital communication can be discovered. As further discussed below, topics are designed to be fluid, and thus can be as expansive or specific as desired. Some enterprises may wish for more detailed information regarding the subjects discussed in malicious emails (e.g., "mergers and acquisitions" vs. "IPOs" vs. "bankruptcy"), in which case more topics may be available for classifying emails. Other enterprises may wish for less detailed information regarding the subjects discussed in malicious emails (e.g., "financial"), in which case fewer topics may be available for classifying emails. Further, enterprises can customize topics of particular relevance/importance to them (e.g., an engineering firm defining a set of topics around research and development vs. a shipping company defining a set of topics around transit, supply chains, etc.), instead of/in addition to topics of broad applicability (e.g., invoices). As applicable, enterprises can provide examples of labeled messages to threat detection platform 100 so that custom models/rules for identifying topics in accordance with those labels can be built/deployed. If needed, a larger data set can be constructed, e.g., using techniques such as nearest neighbor, text augmentation, etc. In various embodiments, topics are hierarchical/multi-class, e.g., with several different subtopics/related topics grouped together (e.g., using multinomial prediction).

In an example implementation, a topic is: (i) a potential subject of text included in an email, (ii) inferable by a human and machine, and (iii) independent of malicious intent. Accordingly, topics can be defined for all emails examined by the threat detection platform, irrespective of whether those emails are representative of attacks. Note that, in some embodiments, topics are defined with sufficient granularity that a given email is labeled as pertaining to multiple topics. This can be done to increase the likelihood that different emails with similar attack goals, such as those mentioned above, are distinguishable from one another.

To create a new topic, the topic is added to configurator 202 by an administrator (e.g., of threat detection platform 100). As shown in FIG. 2A, phrase types (204) and label types (206) may initially be provided to configurator 202 as input. The phrase types may be used by configurator 202 to generate phrase definitions (208), and the label types and phrase definitions can be used by configurator 202 to generate topic definitions (210), mapping topics to different phrase definitions and locations. Topics defined within configurator 202 can then be persisted through to other components and/or layers of threat detection platform 100. As an example, topic definitions 210 can be provided to a topic inference module 212 of a facet inference extractor 214. As shown in FIG. 2A, in some embodiments, facet inference extractor 214 is executed by a real-time scoring module (e.g., an embodiment of scoring module 108) that is configured to quantify the risk posed by incoming emails as discussed above. Topic inference module 212 is configured to infer, based on outputs produced by scoring module 108, one or more appropriate topics for the email. In some embodiments, a given email will have two sets of topics associated with it by threat detection platform 100. The first set of topics corresponds to topics inferred by threat detection platform 100. The second set of topics corresponds to topics explicitly defined or curated by a user of the threat detection platform (e.g., an analyst or administrator of threat detection platform 100, or a representative of an enterprise).

Applicable topics are associated with a given email, e.g., in an appropriate storage location. For example, topic inference module 212 can append labels that are representative of the topics to the email itself, e.g., by using an API provided by an email provider to edit the message (e.g., stored within email store 216) to include the topics (e.g., as one or more X-headers or other metadata). As another example, topic inference module 212 can populate a data structure with information regarding the labels. This data structure can be stored in a database in which email-topic relationships are formalized (e.g., database 218).

In an example of how threat detection platform 100 can be used, suppose a particular type of attack makes use of a malicious email that discusses a merger and acquisition scenario. Configurator 202 can be used to create an appropriate topic so that similar emails can be identified in the future. In particular, configurator 202 creates an appropriate label (e.g., "merger&acquisition" or "M&A") for the topic and then associates with that label, a set of phrases (e.g., "merger and acquisition," "merger/acquisition," "tender offer," "purchase of assets," etc.) that can be used (e.g., as filters) to identify messages to be associated with the label. The topic definition (comprising a label and corresponding phrases) can then be provided to other portions of threat detection platform 100, such as a data object usable by topic inference module 212 (and, e.g., stored in topic framework database 220).

New topics can be automatically learned by/added to threat detection platform 100 based on an analysis of incoming emails and/or outgoing emails. Additionally or alternatively, individuals (e.g., an administrator of threat detection platform 100) can be permitted to manually create topics (e.g., by accessing an administrative console provided by threat detection platform 100). Any human-labeled topics can be altered or deleted by threat detection platform 100 as applicable, based on, for example, whether the manually added topics are actually present in emails (i.e., do any messages match the topic), whether those manually added topics align or overlap with existing topics, etc.

The attack goal facet attempts to characterize an end goal of a given email. As such, the attack goal facet has malicious intent associated with it. Conversely, the topic facet refers to the subjects that are raised in, or related to, the content of an email or other communication (without regard to maliciousness). Table I includes examples of emails with corresponding topics and attack goals.

TABLE I

Examples of emails and corresponding topics and attack goals.

| Email Description | Possible Topic | Possible Attack Goal |
|---|---|---|
| Credential theft message in the context of file sharing a link to an invoice | File Sharing, Invoice | Credential Theft |
| Fraud message in the context of external invoice | Bank Account Information, Call to Action/Engagement, Invoice Payment | Invoice Fraud |

TABLE I-continued

Examples of emails and corresponding topics and attack goals.

| Email Description | Possible Topic | Possible Attack Goal |
|---|---|---|
| Merger and Acquisition Scam | Mergers and Acquisition | Scam |
| Cryptocurrency Engage Message | Call to Action/Engagement, Cryptocurrency | Engage |
| Reconnaissance Message | None | Spam |
| Payment Fraud Message that uses COVID-19 as Pretense | COVID-19, Request for Quote (RFQ) | Payment Fraud |

As can be seen in Table I, it is possible for topics and attack goals to overlap in some instances. For each email, threat detection platform 100 may introduce a many-to-many relationship between the email and the topic labels in which a topic can be associated with more than one email and an email can be associated with more than one topic. Such an approach allows the threat detection platform to support several possible queries, including:

- The ability to filter emails by topic or combination of topics;
- The ability to count the number of emails associated with a given topic; and
- The ability to modify the topics associated with an email, as well as create labels for those topics.

Tables II-IV illustrate various examples of schemas that can be used by embodiments of threat detection platform 100 to associate emails with topics (e.g., in database 218).

TABLE II

Example schema for topics.

| Column Name | Data Type | Column Metadata |
|---|---|---|
| Topic_ID | Integer | Primary Key |
| Topic_Name | str/varchar(255) | Indexed, unique, fixed |
| Date_Created | Date, Time | |
| Topic_Display_Name | str/varchar(255) | How topic is shown to user |

TABLE III

Example schema for storing human-confirmed topics.

| Column Name | Data Type | Column Metadata |
|---|---|---|
| Topic_ID | Integer | Primary Key |
| Message_ID | Integer | Foreign Key |
| Human_Labeled | Boolean | |
| Date_Created | Date, Time | |

TABLE IV

Example schema for storing inferences for measurement.

| Column Name | Data Type | Column Metadata |
|---|---|---|
| Topic_ID | Integer | Primary Key |
| Message_ID | Integer | Foreign Key |
| Date_Created | Date, Time | |

In some embodiments, threat detection platform 100 uses a domain specific language (DSL) to match against messages and their attributes. The DSL allows for the dynamic addition of different rules to assign messages topics, based on static features of the message (e.g., does it contain particular pre-defined phrases) or more dynamic features (e.g., using one or more models to score a message and derive topic information from the score(s)). One benefit of the lightweight nature of topic specification is that time-sensitive topics can be readily added to threat detection platform 100. As an example, attackers often make use of current/world events to lend legitimacy to their attacks (e.g., an attacker referencing a recent fire or other natural disaster as a reason that an email recipient should take an action, such as logging into a payment system). Such topics can efficiently be added to threat detection platform 100 to help identify attacks.

Below are examples of topics and corresponding DSL to identify when a given message matches a topic:

Example Topic: Cryptocurrency

```
"topic_cryptocurrency": [{
"sec:HAS_BITCOIN_ADDRESS": true
},
    {"sec:HAS_BTC_RANSOMWARE_LINGO":true},
    {"feat_attr:CRYPTO_TOPIC_MODEL/gt":0.7}
]
```

The above DSL states that a message can be classified as having a "cryptocurrency" topic if any of the following is true: (1) it includes a bitcoin address, (2) it uses commonly found bitcoin ransomware expressions, or (3) a trained cryptocurrency topic model scores the content higher than 0.7.

Example Topic: Document Sharing

```
"topic_document_sharing": [
    {
        "sec:SUBJECT_HAS_DOCUMENT_SHARING_VOCAB": true,
    "feat_attr:DOCUMENT_SHARE_TOPIC_MODEL/gt":0.9
    },
    {
        "sec:BODY_HAS_DOCUMENT_SHARING_VOCAB": true,
    "feat_attr:DOCUMENT_SHARE_MODEL/gt":0.8
    }
]
```

The above DSL states that a message can be classified as having a "document sharing" topic if either of the following is true: (1) it has document sharing vocabulary in its subject line and the topic model gives it a score of higher than 0.9, or (2) it has a document sharing vocabulary in its body and the topic model gives it a score of higher than 0.8.

Figure 2B:
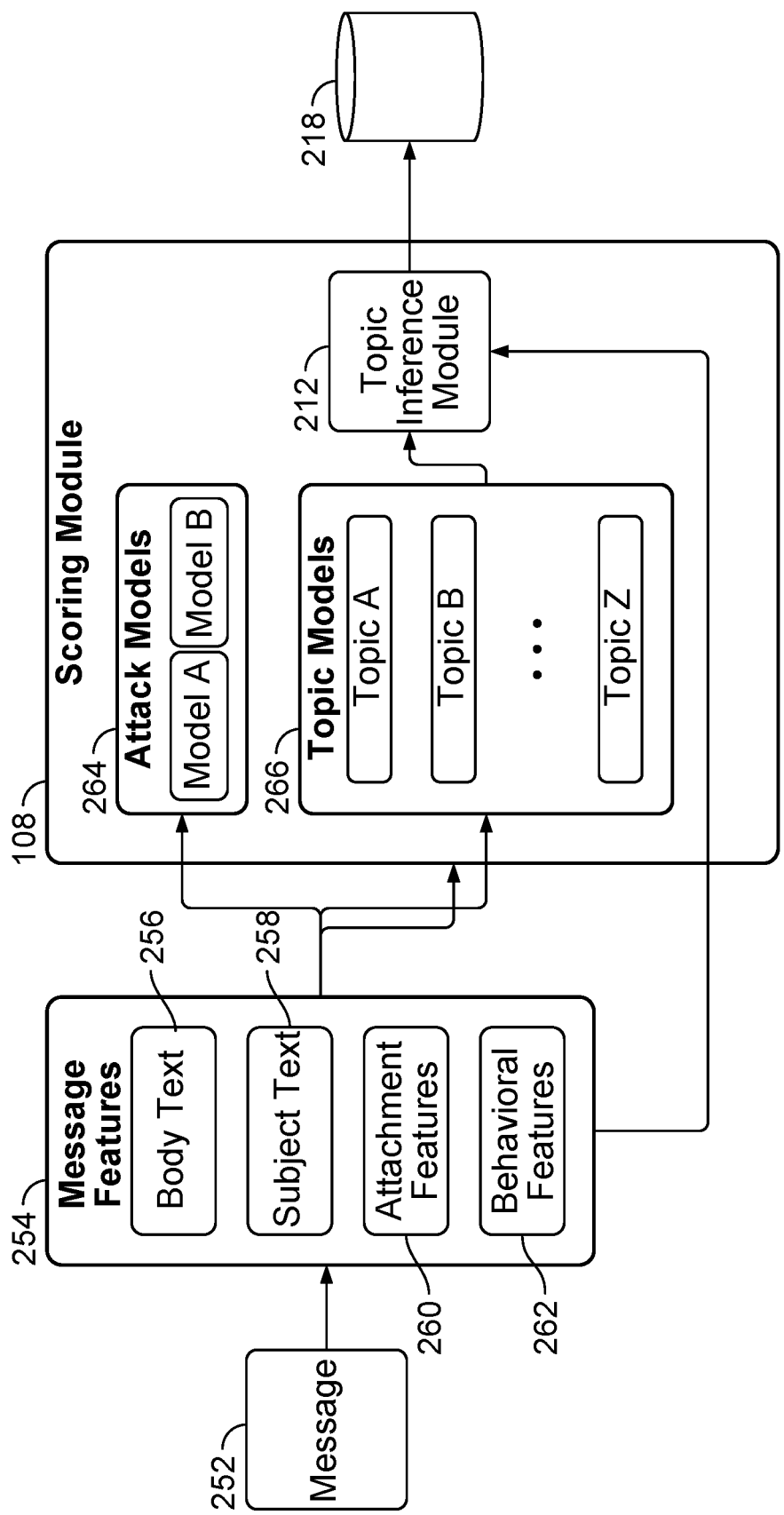
FIG. 2B illustrates an example of a message being processed by a scoring module.

FIG. 2B illustrates an example of a message being processed by a scoring module. As shown, message 252 (e.g., an email message retrieved by threat detection platform 100 from an email provider) has various features 254 (e.g., a body text 256, a subject text 258, attachment(s) 260, and behavioral features 262) that are extracted by threat detection platform 100 and provided to scoring module 108. Scoring module 108 includes a variety of attack models 264 (e.g., assessing whether a particular message is likely to be a phishing attack or a payment fraud attack), and topic models 266 (e.g., assessing whether a particular message discusses a corresponding topic). The extracted features are consumed by both the attack models and the topic models. In various embodiments, scoring module 108 (and subcomponents thereof) is implemented using a set of python scripts. As previously discussed, topic inference module 212 infers one or more topics to associate with message 252 and stores the message/topic(s) mapping in database 218. As applicable, if the topics assigned by topic inference module 212 are determined to be incorrect (e.g., as reported by an end user/message recipient), they can be changed (e.g., by an analyst) and any such mislabeled messages can be used to retrain topic models 266.

IV. Techniques for Surfacing Insights Derived from Messages

Also described herein are approaches to surfacing insights derived from incoming emails by threat detection platform 100. At a high level, one goal is to surface facets—including any topics—in a manner that complements the primary and secondary attributes derived for an incoming email. This is done to better communicate why an incoming email was deemed abnormal. Note that the primary aim is not to explain why the threat detection platform (and, more specifically, its models) determined an email is likely malicious, but instead why the email is abnormal.

Figure 3A:
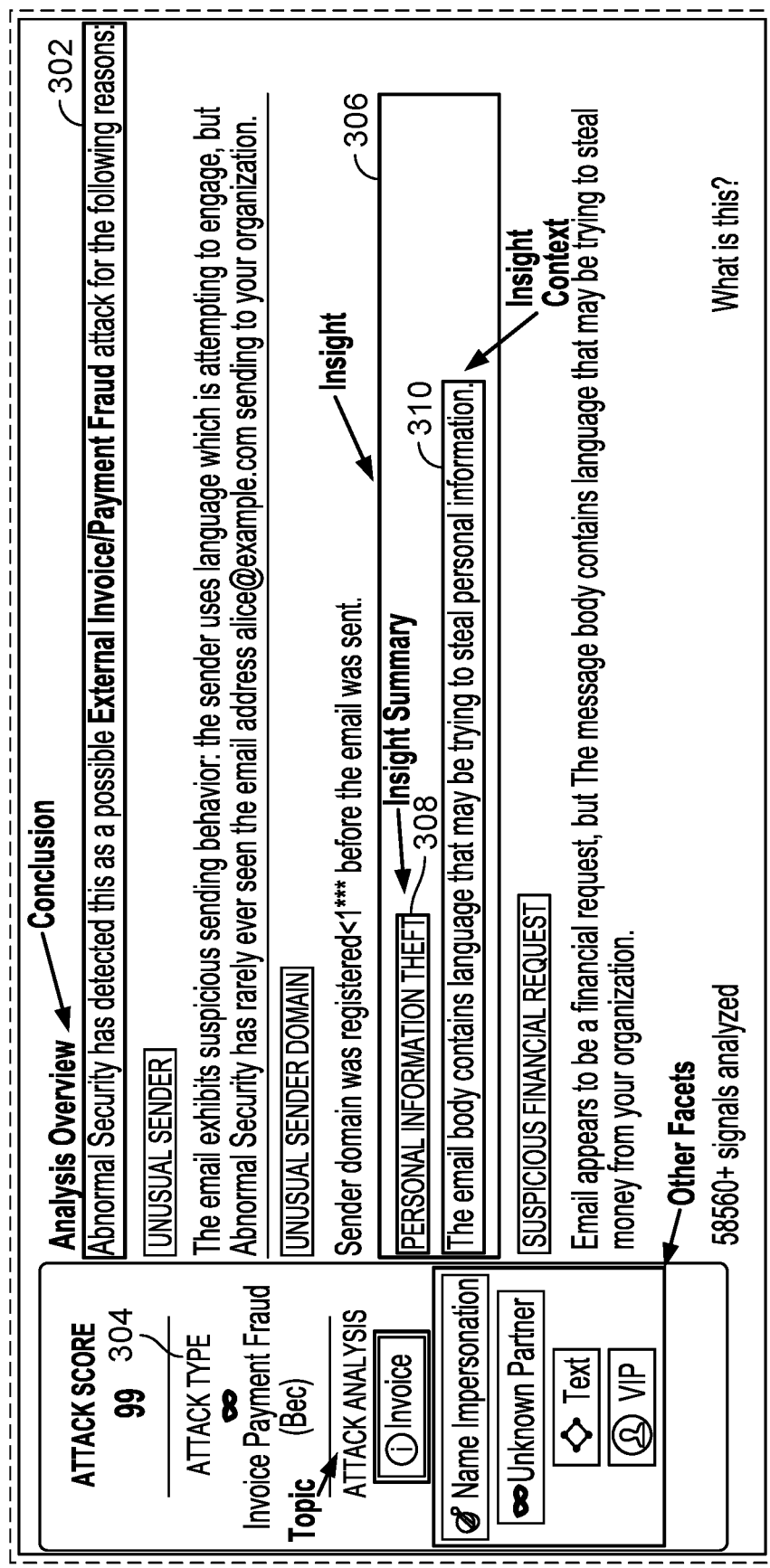
FIG. 3A illustrates an example of an executive summary produced for an incoming email that includes conclusions and insights derived by a threat detection platform.
Figure 3B:
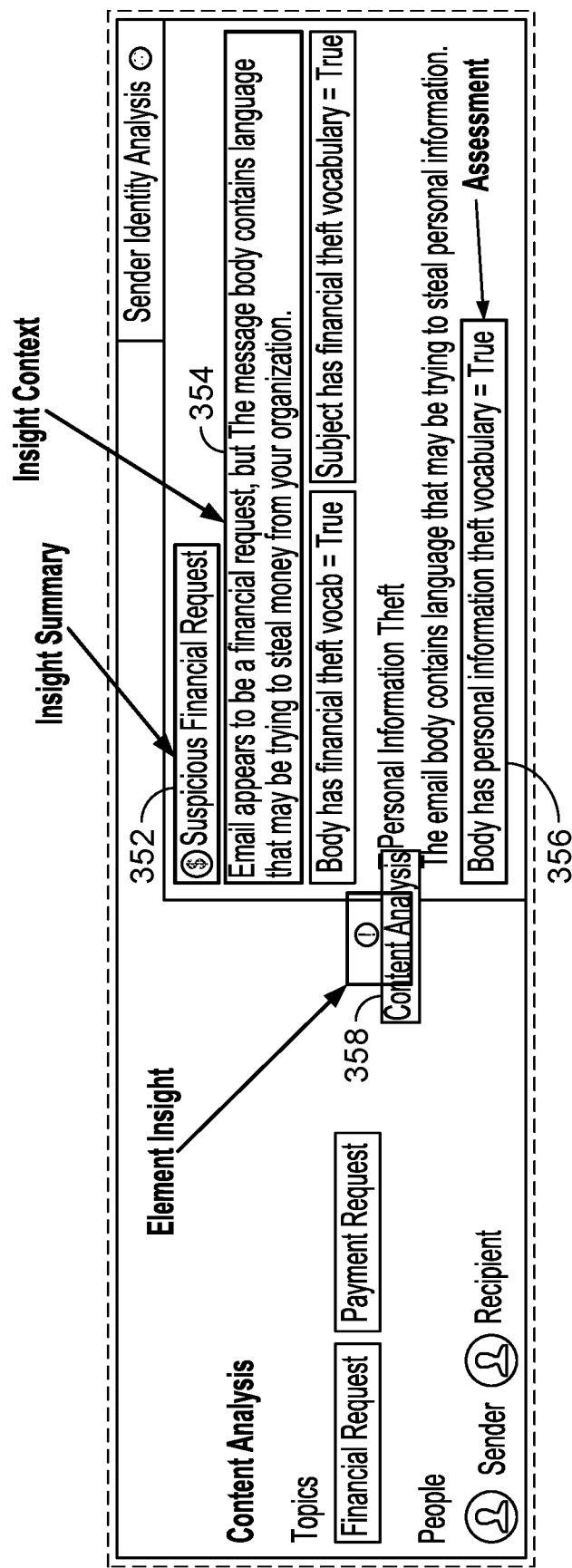
FIG. 3B illustrates an alternate example of a summary.

FIG. 3A illustrates an example of an executive summary ("summary") produced for an incoming email that includes conclusions and insights derived by threat detection platform 100. FIG. 3B also illustrates an alternate example of a summary, this time in the form of a warning message, that is presented alongside primary attributes of the corresponding email. Various examples of elements that can be provided in summaries by embodiments of platform 100 include the following:

Conclusion (302): A top-level statement about how examination of the email concluded.

Attack Type (304): The type of attack of which the email is a part. As illustrated in FIG. 3A, information about other applicable facets can also be included. For example, as shown in FIG. 3A, the attack type is "Invoice Payment Fraud/BEC." The topic of the message is "Invoice," the message involves a "name impersonation" and "unknown partner," does not include an attachment, and targets a VIP. The topics of the message implicated in FIG. 3B are "financial request" and "payment request."

Insight (306): A statement that provides a brief explanation for why the email was deemed abnormal. In some embodiments, the insight includes an insight summary (308, 352), insight context (310, 354) that explains the insight in greater detail, e.g., using data from one or more sources, and assessment (356)—a plain language explanation of a data point that supports the insight (e.g., an assessment for Uncommon Sender may be "Uncommon Sender: True").

Element Insight (358): Refers to insights that do not appear in the summary but appear on other parts of the page, often with a message element. Elements can be ordered based on importance—present for review based on how important the corresponding features were to the determination made by the corresponding detection models.

Importance can be derived using a logistic regression model (part of the linear model class) that is trained to detect attacks. Further, insights can be surfaced/shown only if a relevant features is "true" or passes a threshold. The output of a linear model is essentially the sum of input parameters multiplied by learned weights of that parameter (in the simplest form, $y=mX+C$ where u is the output, X is the input parameter, C is a bias, and m is the weight given to parameter X that was learned). These weights represent how important the parameter is in the equation, learned through the model training process. Consequently, these weights can be extracted from the model and used to determine how important each parameter is to the model. As an example, assume that a detection model has an equation where weights for features A, B, C, and D, are in the descending order B, C, A, D. This means that Feature B is more important than Feature D in the model and therefore has more weight on the final result. Consequently, the importance of the set of features are (in order): Feature B, Feature C, Feature A, Feature D. Further assume that a message exceeds thresholds established for Feature C and Feature A, but Feature B and Feature D are not true. In that case, the threat detection platform may show the insights as follows: insight on Feature C, followed by insight on Feature A, since the insight determined for Feature C is likely to be more relevant and impactful than the insight determined for Feature A. Further, in various embodiments, which insights are surfaced can be made contingent on, e.g., the intended recipient of the attack message. For example, a particular insight can be assigned a lower (or higher) weight (i.e., be more or less likely to be included in a summary report) based on whether the user is a VIP, is in a particular department, etc.

Figure 3C:
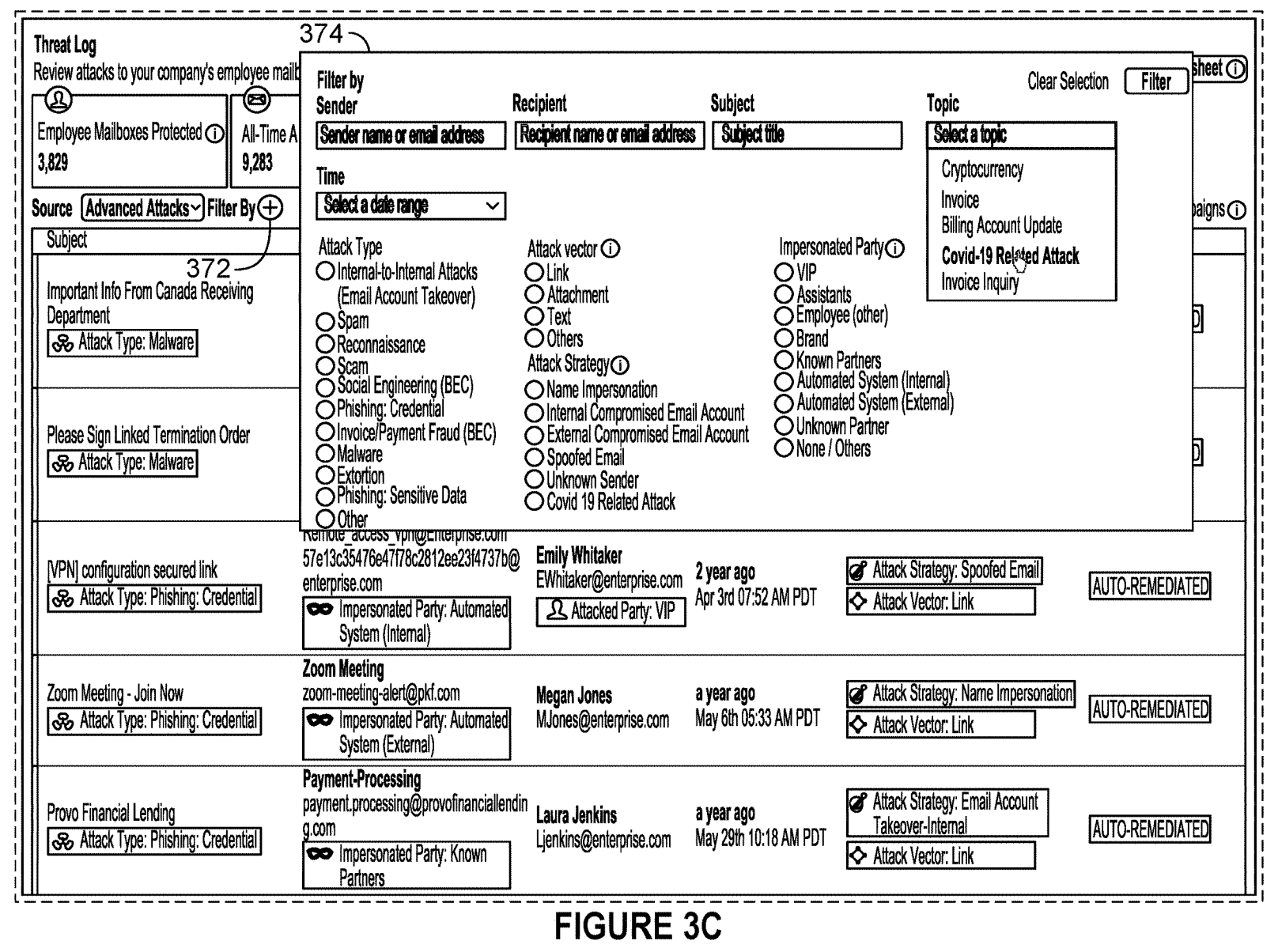

FIG. 3C illustrates an example of an administrator console that can be used, for example, by an administrator of enterprise network 112 to monitor for/investigate security threats. As illustrated in FIG. 3C, the administrator is viewing a threat log that depicts threats detected by threat detection platform 100. The administrator can filter the threat log to show a subset of threats by interacting with filter button 372, which brings up window 374.

Figure 3D:
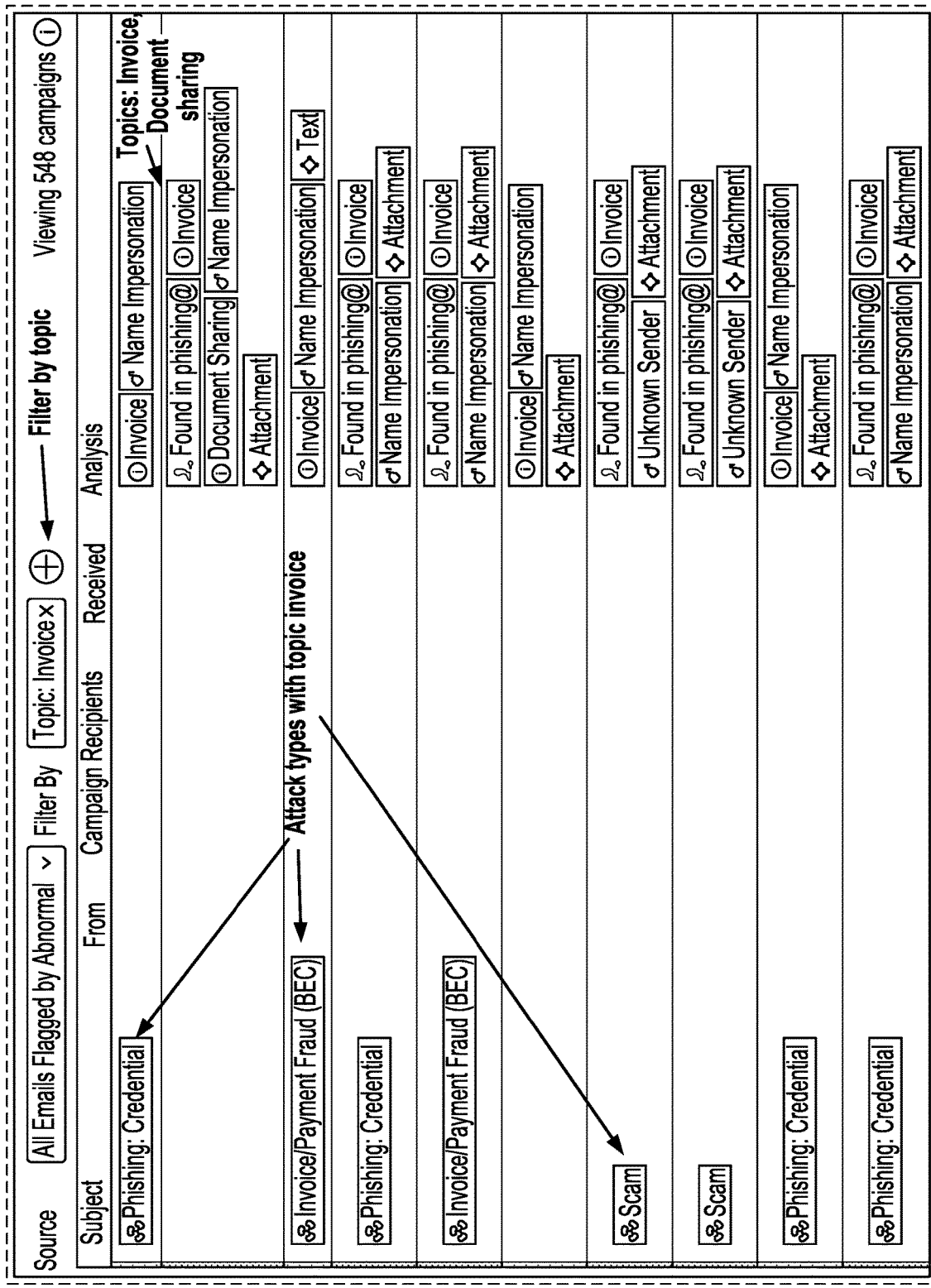
FIG. 3D illustrates a result of applying a filter to a threat log.

FIG. 3D illustrates a result of applying a filter to a threat log. In particular, the administrator viewing the interface shown in FIG. 3C opted to show all "attack" emails (regardless of type of attack) that also involve the topic, "invoice." As shown in FIG. 3D, various types of such attack types include credential phishing, scams, and invoice/payment fraud. As also shown in FIG. 3D, each of the filtered messages pertains to the topic "invoice," while some of the messages also pertain to additional topics (e.g., "document sharing"). Often, attackers will attempt to phish users by sending a document sharing link of an invoice that seems relevant to the user's work. An example of DSL for a document sharing topic appears above. An example of DSL for an invoice topic is as follows:

Example Topic: Invoice

```
"topic_invoice": [
  {
    "sec:INVOICE_PHRASE_MATCH": true,
    "feat_attr:INVOICE_TOPIC_MODEL/gt":0.9
  },
  {
    "sec:HAS_INVOICE_ATTACHMENT": true,
    "feat_attr:INVOICE_TOPIC_MODEL/gt":0.7
  }
]
```

The above DSL states that a message can be classified as having an "invoice" topic if either of the following is true: (1) it includes invoice language in either the subject line or the body and also a trained invoice topic model scores the content higher than 0.9, or (2) it includes an attachment that contains invoice language and also a trained invoice topic model scores the content higher than 0.7.

Figure 4A:
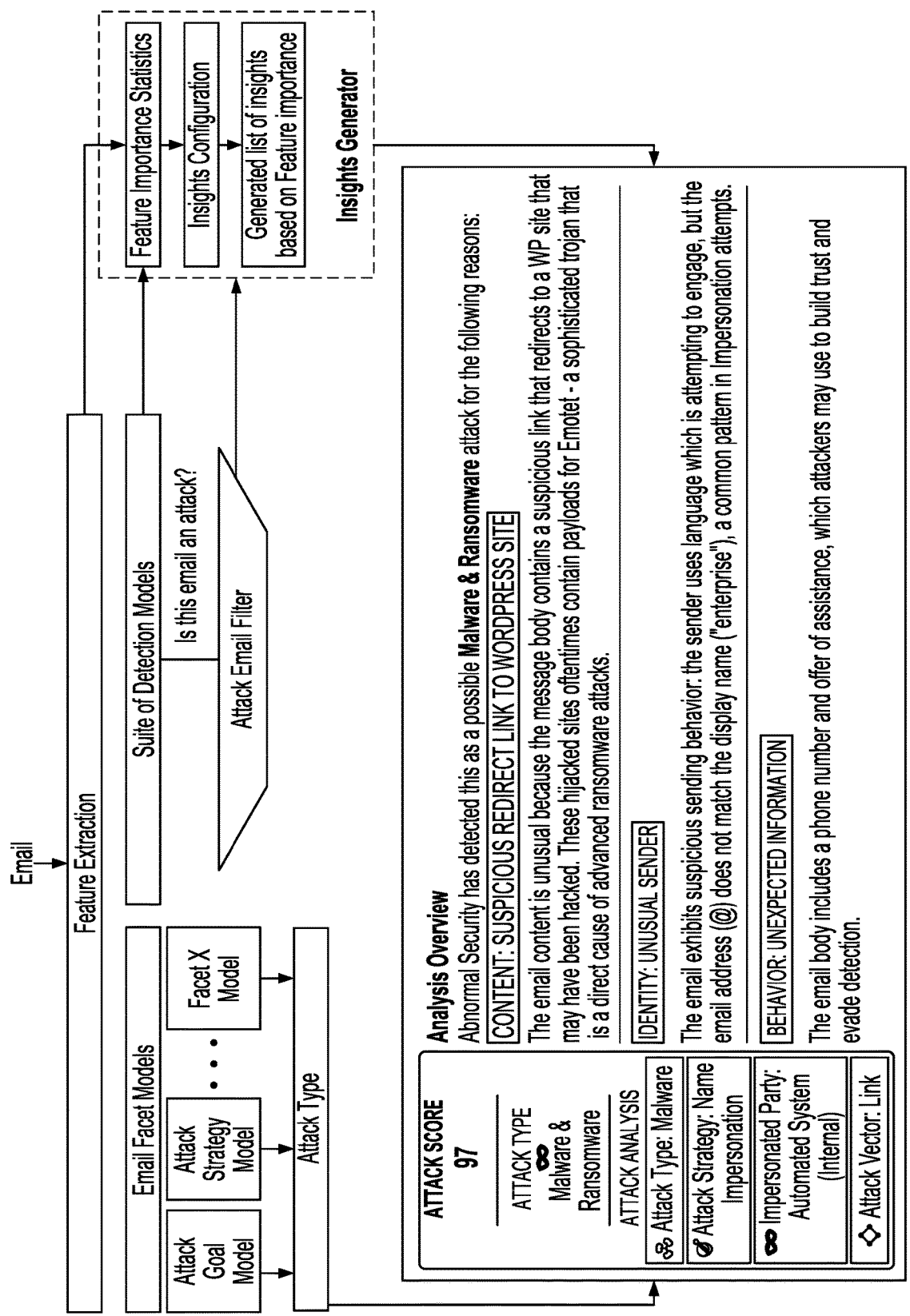
FIG. 4A illustrates an example of a pipeline through which incoming emails can be fed in order to derive insights.

FIG. 4A illustrates an example of a pipeline through which incoming messages can be fed in order to derive insights that can be helpful in understanding the risk posed by those incoming emails. As previously mentioned, it can be increasingly difficult for users to understand the nature of threats posed by malicious messages. Attackers' techniques have gotten sufficiently sophisticated that it can be very difficult for an end user to understand the potential severity of a seemingly innocuous message (or string of messages collectively perpetrating an attack), even when otherwise flagged as potentially dangerous (e.g., by the user's email client). As one example, suppose that one customer of threat detection platform 100 is an American-based medical device manufacturer with subsidiaries in Germany, Spain, and Taiwan. An attacker could impersonate someone working at one of the subsidiaries and target an employee of the American company (e.g., in the finance department) with a scam that asks the employee to update payment information. The employee may erroneously believe the request is legitimate because it is a plausible request from someone seemingly inside the company's ecosystem (particularly without explicit justification provided by threat detection platform 100). This can be particularly problematic if a security analyst working for the company attempts to override a warning that the message is malicious because the analyst erroneously believes the warning to be a false positive. Using the techniques described herein, insight can be surfaced to the user (or an administrator, security personnel, etc.) to make plain why a particular message was flagged. In FIG. 4A, the first step of the pipeline involves extracting features from a message. These features can be, for example, primary attributes or secondary attributes. Primary attributes are generally extracted directly from the communication, while secondary attributes are determined or derived from the primary attributes.

Primary attributes can be extracted by one or more primary attribute extractors, each extracting one or more primary attributes from the communication. The primary attribute extractors can be global (e.g., shared across multiple entities) or specific to an entity. Examples of primary attributes include the sender's display name, sender's username, Sender Policy Framework (SPF) status, DomainKeys Identified Mail (DKIM) status, number of attachments, number of links in the email body, spam or phishing metrics (e.g., continent or country of origin), whether data between two fields that should match are mismatched, header information, or any other suitable communication data. Primary attributes can optionally include metadata attributes (e.g., company identifier (ID), message ID, conversation ID, individual ID, etc.).

Secondary attributes can be determined by one or more secondary attribute extractors, each extracting one or more secondary attributes from the primary attributes for a given message. The secondary attribute extractors can be global (e.g., shared across multiple entities) or specific to an entity. The secondary attributes can be determined from a time series of primary attribute values (e.g., wherein each primary attribute value can be associated with a timestamp, such as the sent timestamp or receipt timestamp of the email), from all primary attribute values, from a single primary attribute value, from the values of multiple primary attributes, or from any other suitable set of data. Examples of secondary attributes can include: frequencies, such as sender frequencies (e.g., sender fully qualified domain name (FQDN) frequencies, sender email frequencies, etc.) or domain frequencies (e.g., SPF status frequencies for a given domain, DKIM status frequencies for a given domain, the frequency at which the system receives the same or similar email body from a given domain, how frequently emails are received from that domain, how frequently emails are sent to that domain, etc.); determining a mismatch between one or more primary attributes that should match; employee attributes (e.g., name, title, whether the entity is employed, whether the entity has a high attack risk, whether the entity is suspicious, whether the entity has been attacked before, etc.); vendor attributes (e.g., vendor name, whether the vendor is an exact match with a known vendor, whether there is a vendor Unicode lookalike, etc.); whether the body of the communication includes one of a set of high-risk words, phrases, sentiments, or other content (e.g., whether the communication includes financial vocabulary, credential theft vocabulary, engagement vocabulary, non-ASCII content, attachments, links, etc.); domain information (e.g., domain age, whether the domain is blacklisted or whitelisted, whether the domain is internal or external, etc.); heuristics (e.g., whether the FQDN, domain, domain name, etc. has been seen before, either globally or by the entity); primary attribute value (e.g., as extracted from the communication) deviation from the respective baseline value (e.g., deviation magnitude, whether the value has deviated beyond a predetermined variance or difference threshold); or any other suitable attribute, feature, or variable. In some embodiments, the secondary attributes are determined as a function of the primary attributes. One example of a primary attribute is a sender email address, while one example of a secondary attribute is the statistics of communications patterns from sender address to recipient, department, organization, and universe of customers.

These features can be used by a suite of detection models that are designed to determine whether the incoming email is representative of an attack. Upon determining that the incoming email is representative of an attack, the features and associated statistics indicating importance to the determination rendered by the suite of detection models can be examined in order to generate an insight. An insight is a statement of the rationale for why the incoming email was deemed to be abnormal. Often, the threat detection platform will derive multiple insights for a given incoming email. In these scenarios, the threat detection platform can sort the insights based on the importance of the corresponding features. This may be useful if a subset of the insights (e.g., 2, 3, or 5) are to be presented in a report (an example of which is shown in FIG. 4B).

As shown in FIG. 4A, the features extracted from the incoming email can also be provided as input to one or more facet models. These facet models are configured to establish or derive information regarding the threat posed by the incoming email. In FIG. 4A, for example, threat detection platform 100 applies facet models that are designed to establish the attack goal and attack strategy. Outputs produced by the facet models (or analysis of such outputs) can also be included in the report.

FIG. 4B illustrates an example of a report that surfaces various insights about why a particular message was considered harmful by threat detection platform 100. FIG. 4B represents a view that an end user (e.g., the message recipient) or other user (e.g., an administrator or security operations representative) could access via an interface provided by threat detection platform 100 to learn more about the message. As illustrated in FIG. 4B, a total of 43,514 signals were analyzed by threat detection platform 100. The three most important insights about the message (e.g., signals or combinations of signals) are presented in region 452. The attack type is a "malware and ransomware attack."

V. Example Process

Figure 5:
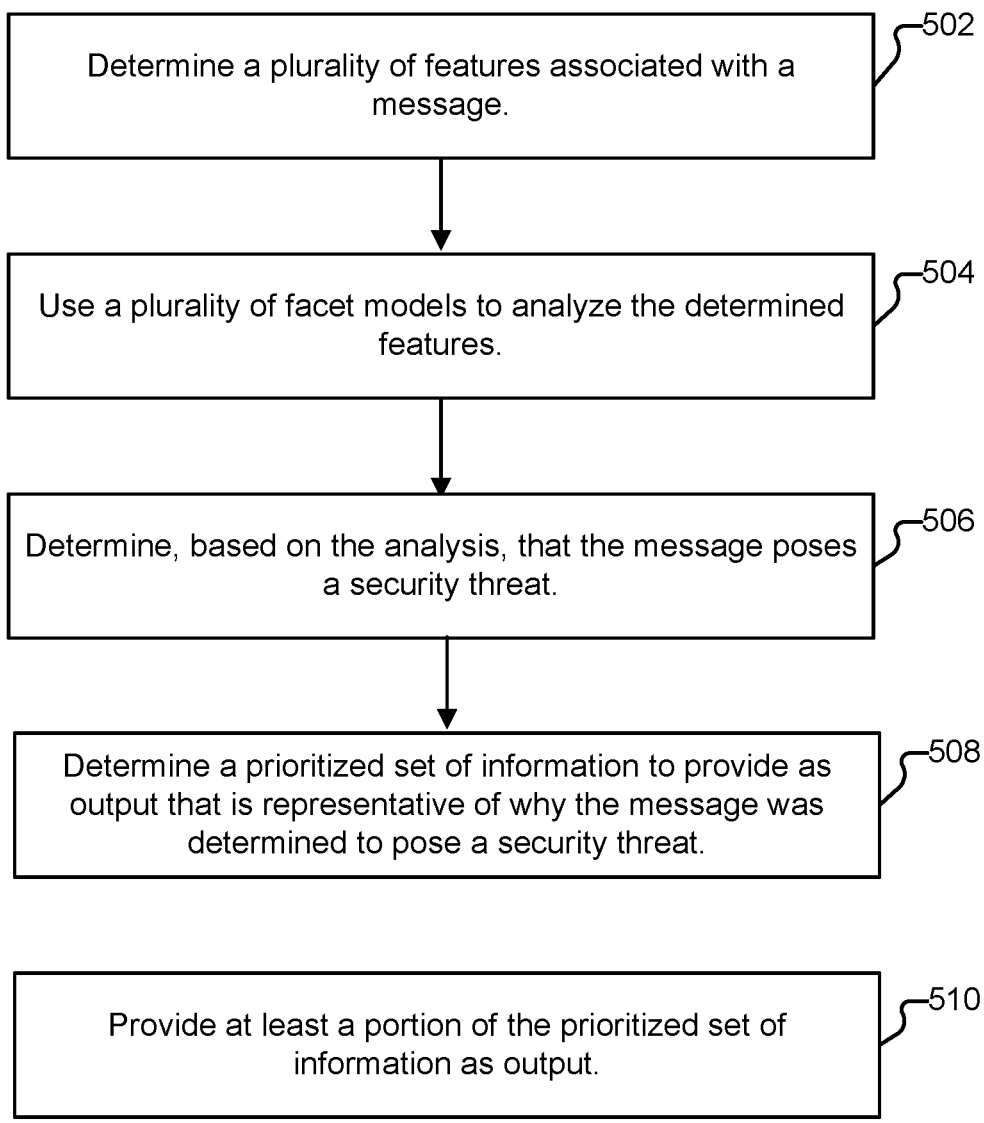
FIG. 5 illustrates an example of a process for deriving and surfacing insights regarding security threats.

FIG. 5 illustrates an example of a process for deriving and surfacing insights regarding security threats. In various embodiments, process 500 is performed by a threat detection platform, such as threat detection platform 100. The process begins at 502 when a plurality of features associated with a message is determined. As one example, at 502, threat detection platform 100 accesses an electronic message store (e.g., in response to an indication provided by an API) that one or more unprocessed messages are present for a user. Feature extraction is performed on one such message, to obtain, for example, the body text, subject text, attachment, features, behavioral features, etc. At 504, a plurality of facet models is used to analyze determined features of the message. As explained above, examples of facet models include a variety of attack models (e.g., identifying an attack type, attack strategy, etc.) as well as one or more topic models (e.g., trained to identify particular topics using appropriate machine-learning techniques, and/or configured using heuristics/rules to identify topics). A variety of approaches can be used to implement topic-specific models in an environment such as threat detection platform 100. Examples include scikit-learn, Natural Language Toolkit (NLTK), and Bidirectional Encoder Representations from Transformers (BERT). At 506, a determination is made, based on the analysis, whether the message poses a security threat (e.g., one or more threat scores exceed a threshold). If so, at 508, a prioritized set of information to provide as output, that is representative of why the message was determined to pose a security threat, is determined. An example of the top items in such a prioritized set is depicted, for example, in FIG. 4B, where "Content: Suspicious Redirect Link to Wordpress Site," "Identity: Unusual Sender," and "Behavior: Unexpected Information" are selected for presentation in region 452 of an interface. Finally, at 510, at least a portion of the prioritized set of information is provided as output (e.g., when an end user accesses reporting information, receives/opens an alert with such information included inside, clicks on a link offering to provide more information about why a particular message was flagged, etc). As discussed above, such insights can be used in a variety of ways, including helping better secure an enterprise network (e.g., by identifying to security operations the existence of particular, sophisticated, attacks targeting high value endpoints such as a VIP), and providing more accurate security services (e.g., by providing a feedback mechanism to retrain/improve models that erroneously classify messages).

VI. Example Processing System

Figure 6:
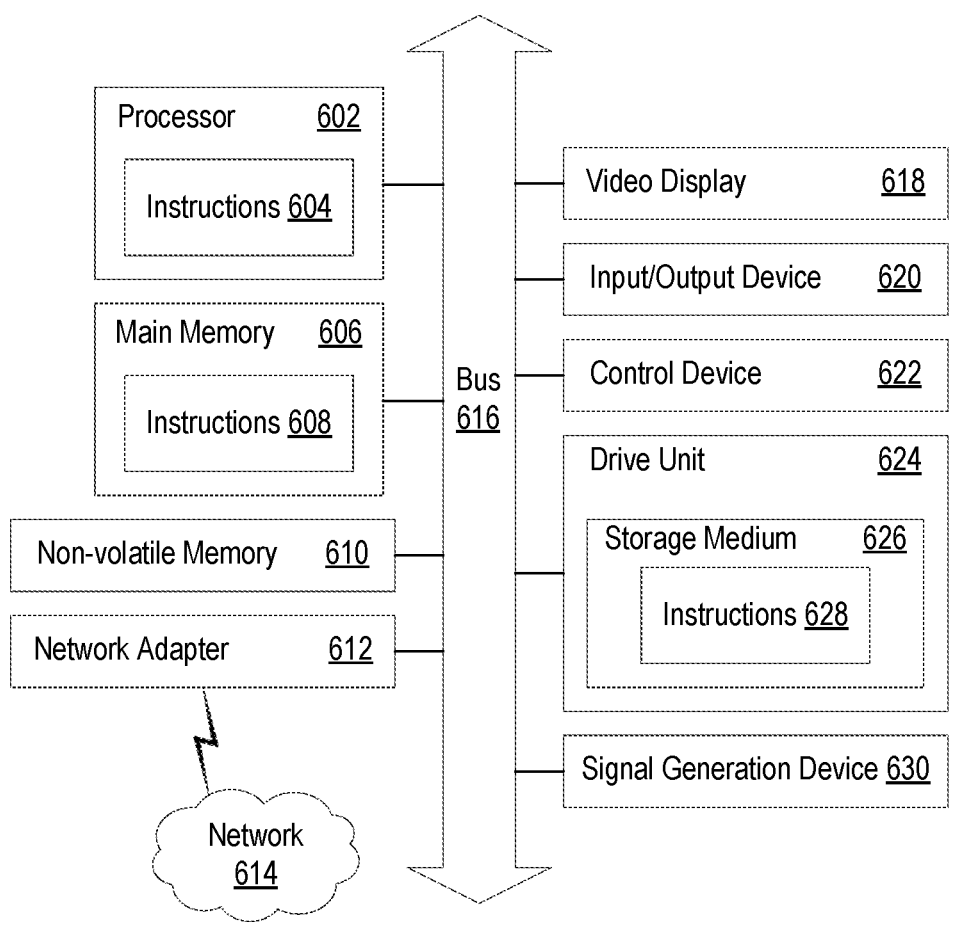
FIG. 6 is a block diagram illustrating an example of a processing system.

FIG. 6 is a block diagram illustrating an example of a processing system 600 in which at least some operations described herein can be implemented. For example, components of processing system 600 can be hosted on one or more electronic devices used to provide a threat detection platform (e.g., threat detection platform 100 of FIG. 1).

Processing system 600 includes a processor 602, main memory 606, non-volatile memory 610, network adapter 612 (e.g., a network interface), video display 618, input/output device 620, control device 622 (e.g., a keyboard, pointing device, or mechanical input such as a button), drive unit 624 that includes a storage medium 626, or signal generation device 630 that are communicatively connected to a bus 616. Bus 616 is illustrated as an abstraction that represents one or more physical buses and/or point-to-point connections that are connected by appropriate bridges, adapters, or controllers. Bus 616, therefore, can include a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit (I2C) bus, and/or a bus compliant with Institute of Electrical and Electronics Engineers (IEEE) Standard 1394, etc.

While main memory 606, non-volatile memory 610, and storage medium 626 are shown to be a single medium, the terms "storage medium" and "machine-readable medium" should be taken to include a single medium or multiple media that store one or more sets of instructions 628. The terms "storage medium" and "machine-readable medium" should also be taken to include any medium that is capable of storing, encoding, or carrying a set of instructions for execution by the processing system 600. Further examples of machine- and computer-readable media include recordable-type media such as volatile and non-volatile memory devices 610, removable disks, hard disk drives, optical disks (e.g., Compact Disk Read-Only Memory (CD-ROMS) and Digital Versatile Disks (DVDs)), cloud-based storage, and transmission-type media such as digital and analog communication links.

In general, the routines executed to implement embodiments described herein can be implemented as part of an operating system or a specific application, component, program, object, module, or sequence of instructions (collectively referred to as "computer programs"). The computer programs typically comprise one or more instructions (e.g., instructions 604, 608, and/or 628) set at various times in various memories and storage devices in an electronic device. When read and executed by the processor 602, the instructions cause the processing system 600 to perform operations to execute various aspects of techniques described herein.

Network adapter 612 allows processing system 600 to mediate data in a network 614 with an entity that is external to the processing system 600 through any communication protocol supported by the processing system 600 and the external entity. Examples of network adapter 612 include a network adaptor card, a wireless network interface card, a switch, a protocol converter, a gateway, a bridge, a hub, a receiver, a repeater, or a transceiver that includes an integrated circuit (e.g., enabling communication over Bluetooth or Wi-Fi), etc.

Techniques introduced here can be implemented using software, firmware, hardware, or a combination of such forms. For example, various aspects can be implemented using special-purpose hardwired (i.e., non-programmable) circuitry in the form of application-specific integrated circuits (ASICs), programmable logic devices (PLDs), field-programmable gate arrays (FPGAs), and the like.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
establish, via an application programming interface, a connection with a storage medium that includes a series of communications received by an employee of an enterprise and obtain an email that is addressed to the employee;
determine a plurality of features associated with the obtained email;
use a plurality of facet models to analyze the determined plurality of features;
determine, based at least in part on the analysis, that the obtained email poses a security threat;
determine a prioritized set of information to provide as output in a report, wherein the prioritized set of information is representative of why the email was determined to pose a security threat; and
provide at least a portion of the prioritized set of information as output in an interface; and
a memory coupled to the processor and configured to provide the processor with instructions.

2. The system of claim 1, wherein at least one facet model included in the plurality of facet models is an attack type model that identifies a type of attack of which the email is a part, wherein the attack type is derived based on a combination of other facets.

3. The system of claim 1, wherein at least one facet model included in the plurality of facet models is an attack strategy model that identifies a strategy used in the email to perpetrate an attack.

4. The system of claim 1, wherein at least one facet model included in the plurality of facet models is an impersonated party model that identifies an entity that a sender of the email is attempting to impersonate.

5. The system of claim 1, wherein at least one facet model included in the plurality of facet models is an attacked party model that indicates an entity that is a target of an attack carried out by the email.

6. The system of claim 1, wherein at least one facet model included in the plurality of facet models is an attack goal model that identifies a goal of an attack carried out by the email.

7. The system of claim 1, wherein at least one facet model included in the plurality of facet models is an attack vector model that identifies a mechanism by which an attack is carried out by the email.

8. The system of claim 1, wherein the prioritized set of information is determined based at least in part on an identity or group membership of a message recipient.

9. The system of claim 1, wherein the prioritized set of information is determined based at least in part by using a logistic regression model that is trained to detect attacks.

10. The system of claim 1, wherein the report includes information indicating whether the email has associated email campaign activity.

11. A method, comprising:
establishing, via an application programming interface, a connection with a storage medium that includes a series of communications received by an employee of an enterprise and obtaining an email that is addressed to the employee;
determining a plurality of features associated with the obtained email;
using a plurality of facet models to analyze the determined plurality of features;
determining, based at least in part on the analysis, that the obtained email poses a security threat;
determining a prioritized set of information to provide as output in a report, wherein the prioritized set of information is representative of why the email was determined to pose a security threat; and
providing at least a portion of the prioritized set of information as output in an interface.

12. The method of claim 11, wherein at least one facet model included in the plurality of facet models is an attack type model that identifies a type of attack of which the email is a part, wherein the attack type is derived based on a combination of other facets.

13. The method of claim 11, wherein at least one facet model included in the plurality of facet models is an attack strategy model that identifies a strategy used in the email to perpetrate an attack.

14. The method of claim 11, wherein at least one facet model included in the plurality of facet models is an impersonated party model that identifies an entity that a sender of the email is attempting to impersonate.

15. The method of claim 11, wherein at least one facet model included in the plurality of facet models is an attacked party model that indicates an entity that is a target of an attack carried out by the email.

16. The method of claim 11, wherein at least one facet model included in the plurality of facet models is an attack goal model that identifies a goal of an attack carried out by the email.

17. The method of claim 11, wherein at least one facet model included in the plurality of facet models is an attack vector model that identifies a mechanism by which an attack is carried out by the email.

18. The method of claim 11, wherein the prioritized set of information is determined based at least in part on an identity or group membership of a message recipient.

19. The method of claim 11, wherein the prioritized set of information is determined based at least in part by using a logistic regression model that is trained to detect attacks.

20. The method of claim 11, wherein the report includes information indicating whether the email has associated email campaign activity.

21. A computer program product embodied in a non-transitory tangible computer readable storage medium and comprising computer instructions for:
establishing, via an application programming interface, a connection with a storage medium that includes a series of communications received by an employee of an enterprise and obtaining an email that is addressed to the employee;

determining a plurality of features associated with the obtained email;

using a plurality of facet models to analyze the determined plurality of features;

determining, based at least in part on the analysis, that the obtained email poses a security threat;

determining a prioritized set of information to provide as output in a report, wherein the prioritized set of information is representative of why the email was determined to pose a security threat; and providing at least a portion of the prioritized set of information as output in an interface.

* * * * *